United States Patent
Goedecke

(10) Patent No.: US 10,422,155 B2
(45) Date of Patent: Sep. 24, 2019

(54) FENCE AND FENCE CONNECTION APPARATUS AND METHOD

(71) Applicant: Bullet Fence Systems, LLC, Okmulgee, OK (US)

(72) Inventor: Ronald D. Goedecke, Okmulgee, OK (US)

(73) Assignee: BULLET FENCE SYSTEMS, LLC, Okmulgee, OK (US)

( * ) Notice: Subject to any disclaimer, the term of this patent is extended or adjusted under 35 U.S.C. 154(b) by 386 days.

(21) Appl. No.: 15/363,944

(22) Filed: Nov. 29, 2016

(65) Prior Publication Data
US 2017/0159321 A1 Jun. 8, 2017

Related U.S. Application Data

(60) Provisional application No. 62/264,039, filed on Dec. 7, 2015.

(51) Int. Cl.
| | | |
|---|---|---|
| *E04H 17/14* | (2006.01) | |
| *F16B 7/04* | (2006.01) | |
| *F16B 7/18* | (2006.01) | |

(52) U.S. Cl.
CPC ..... *E04H 17/1421* (2013.01); *E04H 17/1413* (2013.01); *F16B 7/044* (2013.01);
(Continued)

(58) Field of Classification Search
CPC ............ E04H 17/1413; E04H 17/1421; E04H 17/1434; E04H 17/1443; E04H 2017/1447;
(Continued)

(56) References Cited

U.S. PATENT DOCUMENTS

| 1,765,651 A | 6/1923 | Bryant | |
|---|---|---|---|
| 1,822,389 A * | 9/1931 | Blakely | F16B 7/0486 403/199 |

(Continued)

FOREIGN PATENT DOCUMENTS

| GB | 2307256 | 5/1997 | |
|---|---|---|---|
| GB | 2523343 | 8/2015 | |
| WO | WO 96/30656 | * 10/1996 | F16B 2/10 |

OTHER PUBLICATIONS

PCT/US2016/064019; International Search Report and Written Opinion; dated Feb. 7, 2016; Applicant: Bullet Fence Systems, LLC; Published in: WO.

(Continued)

*Primary Examiner* — Michael P Ferguson
(74) *Attorney, Agent, or Firm* — Dennis D. Brown; Brown Patent Law, P.L.L.C.

(57) ABSTRACT

A connector assembly and method for constructing a no-weld pipe fence, a no-weld fence end brace, or a no-weld fence corner brace. The connector assembly includes (a) a bolt, a threaded pin, or a hinge knuckle structure which is attachable to a fence post and (b) an attachment sleeve which can be slidably nested on the end of a pipe rail or brace member. The attachment sleeve is connectable to the bolt, threaded pin, or hinge knuckle structure in a manner which allows the pipe rail or brace member to be pivoted to a horizontal position or to any other desired angle on the fence post and then locked in place.

7 Claims, 29 Drawing Sheets

(52) U.S. Cl.
CPC ........ *F16B 7/18* (2013.01); *E04H 2017/1452* (2013.01); *E04H 2017/1473* (2013.01); *E04H 2017/1491* (2013.01)

(58) Field of Classification Search
CPC .... E04H 2017/1452; E04H 2017/1473; E04H 2017/1491; E04F 11/1804; E04F 11/1817; E04F 11/1834; E04F 11/1836; E04F 2011/1819; E04F 2011/1821; Y10T 403/32861; Y10T 403/32122; F16B 7/044; F16B 7/048; F16B 7/0486
USPC ............. 256/64, 65.03, 65.04, 65.05, 67, 68
See application file for complete search history.

(56) References Cited

U.S. PATENT DOCUMENTS

| | | | |
|---|---|---|---|
| 2,150,651 A * | 3/1939 | Ewing | E04F 11/1817 228/164 |
| 2,212,455 A | 8/1940 | Reed | |
| 2,242,427 A | 2/1941 | Heanue | |
| 2,764,438 A * | 9/1956 | Haviland | E04H 17/1413 248/230.8 |
| 3,648,982 A | 3/1972 | Sabel et al. | |
| 3,772,837 A | 11/1973 | Hunt | |
| 4,074,893 A | 2/1978 | Coltrin | |
| 4,078,772 A | 3/1978 | Carbone | |
| 4,140,414 A | 2/1979 | Buttgereit | |
| 4,718,789 A * | 1/1988 | Kuenen | F16B 7/0446 403/233 |
| 5,026,028 A | 6/1991 | Ooi et al. | |
| 5,028,161 A * | 7/1991 | Peleg | F16B 7/04 403/191 |
| 5,593,143 A | 1/1997 | Ferrarin | |
| 5,971,365 A | 10/1999 | Pigott et al. | |
| 6,386,519 B1 | 5/2002 | Priefert | |
| 6,802,496 B1 * | 10/2004 | Preta | E04H 17/1413 16/253 |
| 7,048,259 B2 | 5/2006 | Quaintance et al. | |
| 7,121,530 B1 | 10/2006 | Preta | |
| 7,347,412 B1 | 3/2008 | Zhu | |
| 7,517,169 B2 * | 4/2009 | Dalum | F16M 11/10 248/139 |
| 7,784,744 B2 | 8/2010 | Becker | |
| 7,788,785 B2 | 9/2010 | Platt | |
| 8,632,056 B1 | 1/2014 | Roberts et al. | |
| 2006/0033093 A1 | 2/2006 | Lo | |
| 2008/0029748 A1 | 2/2008 | Ford | |
| 2008/0061279 A1 | 3/2008 | Sullivan | |
| 2014/0131647 A1 | 5/2014 | Dillon | |
| 2015/0123061 A1 * | 5/2015 | Walters | E04H 17/1421 256/21 |

OTHER PUBLICATIONS

Internet Printout; Simple Connector; 440 Ranch Fence by Ameristar; US.
Internet Printout; Kencove Wedge-Loc; Kencove Farm Fence Supplies; US.
Internet Printout; Speed Brace; www.orshelnfarmhome.com; US.
Internet Printout; T-Post Smart Brace; Dillon Fencing; US.
Internet Printout; No Weld Pipe Connectors; No Weld Products, Inc.; 2015; US.

* cited by examiner

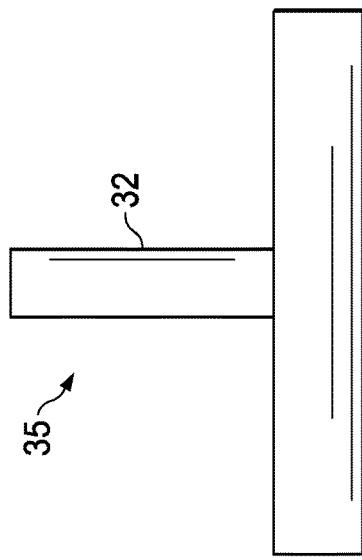
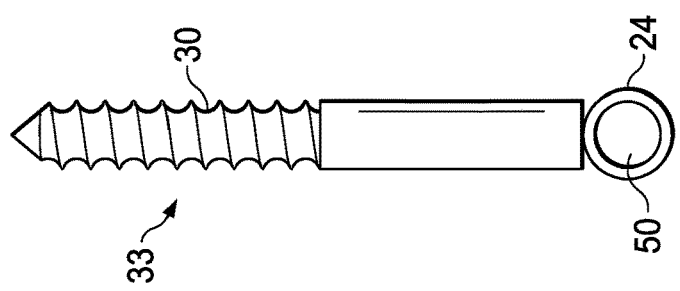
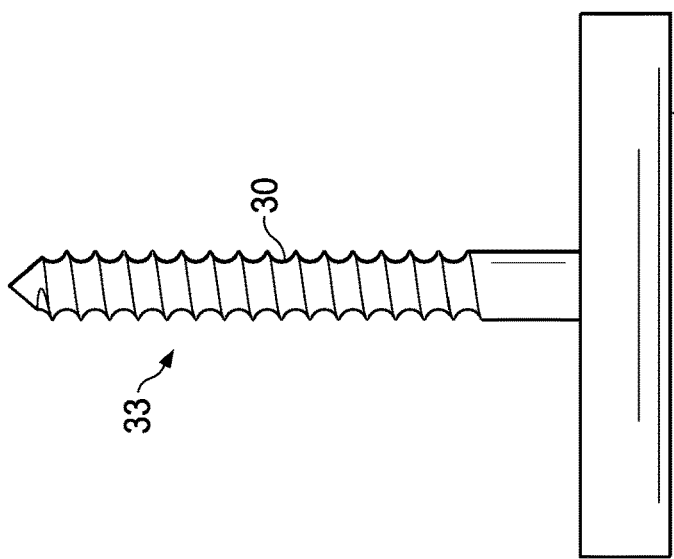

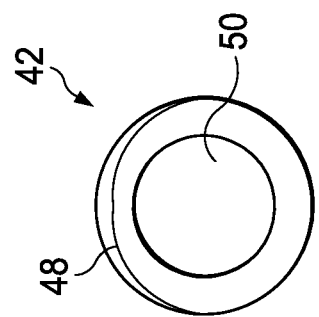
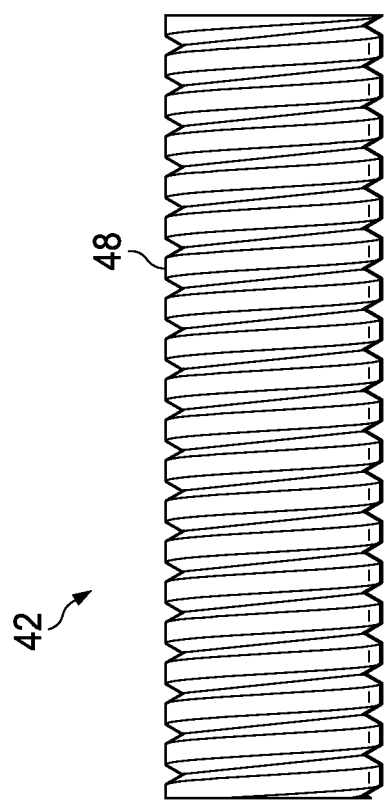

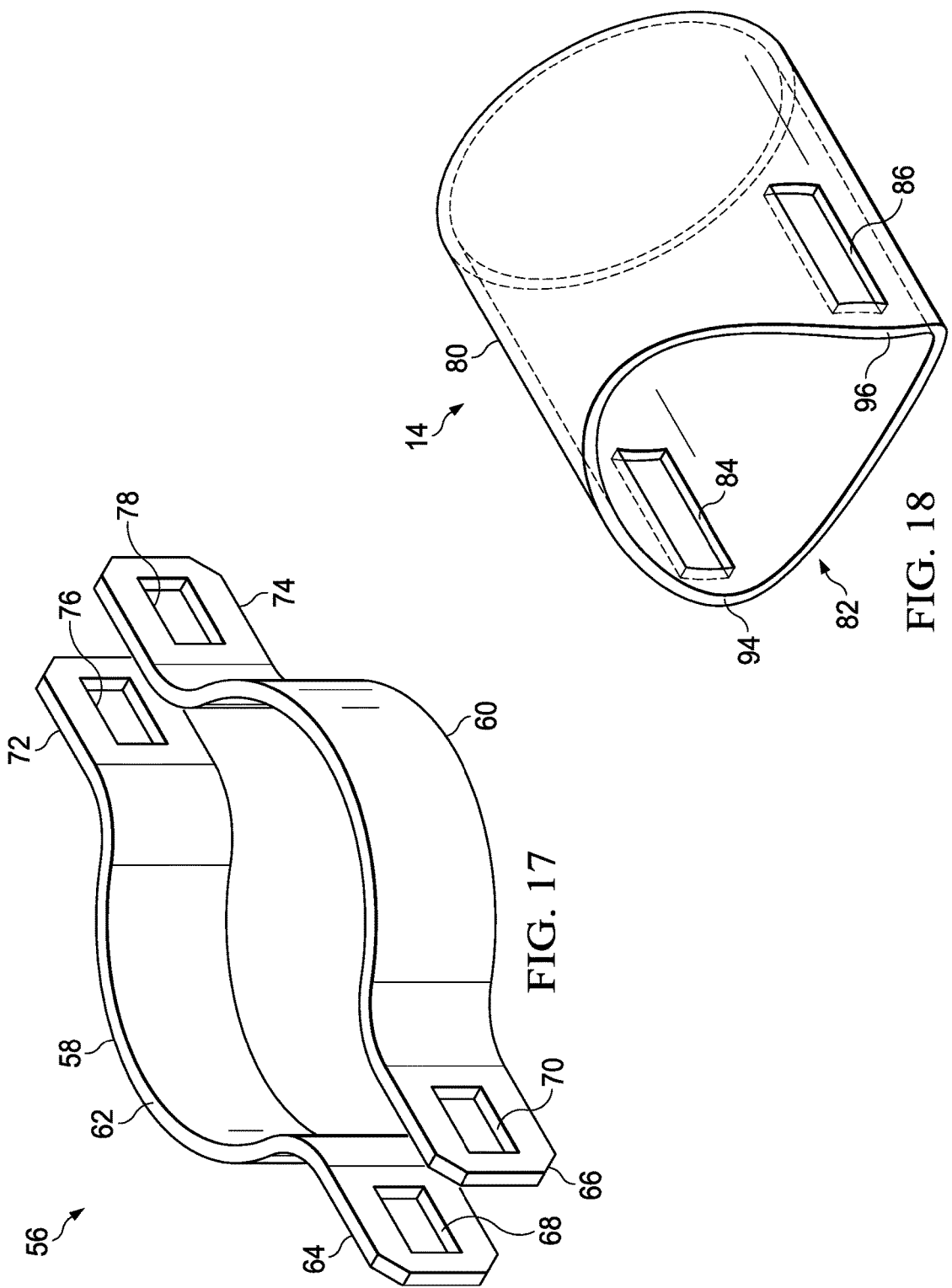

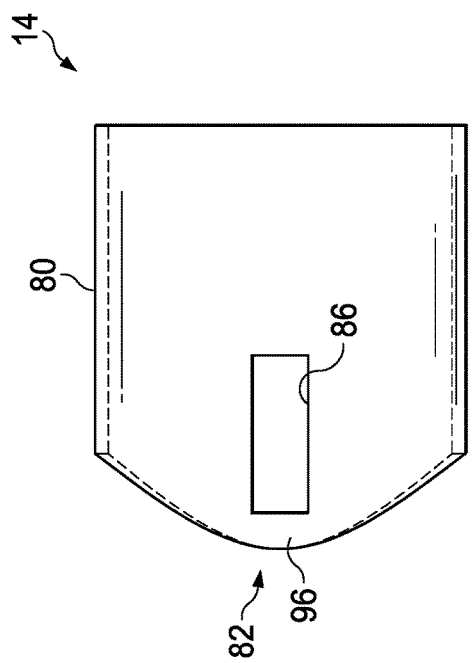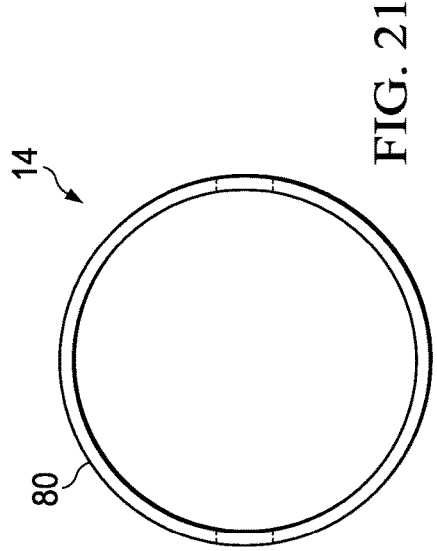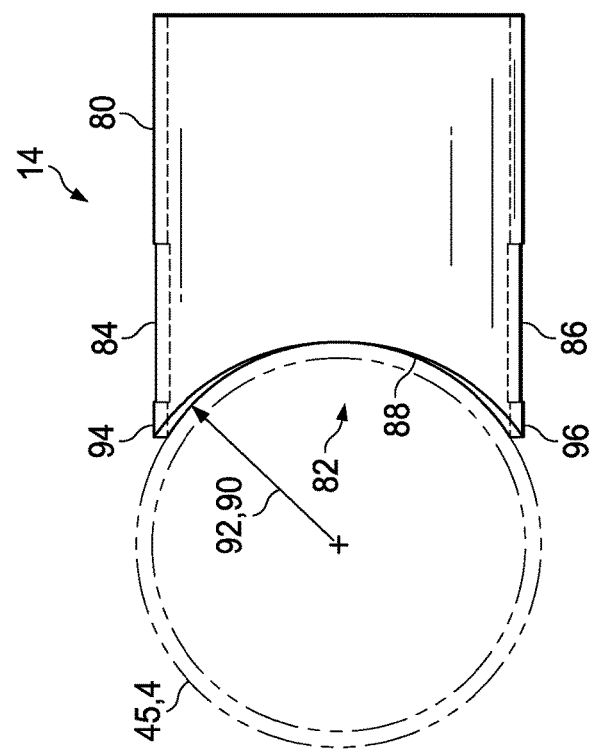

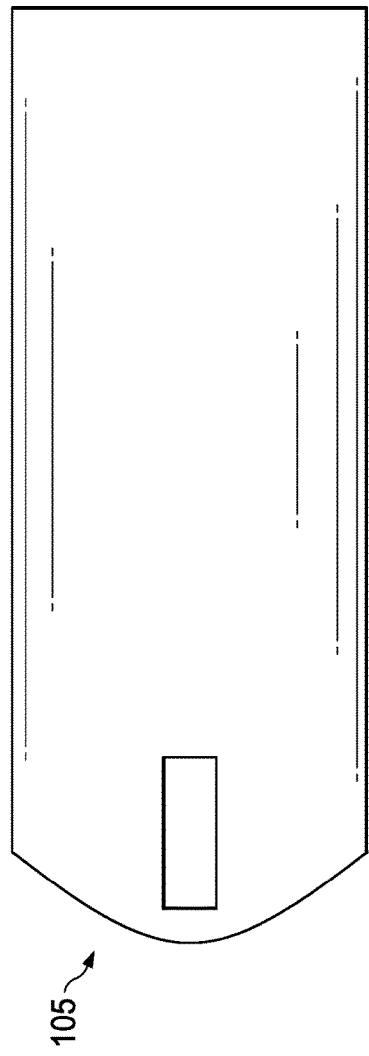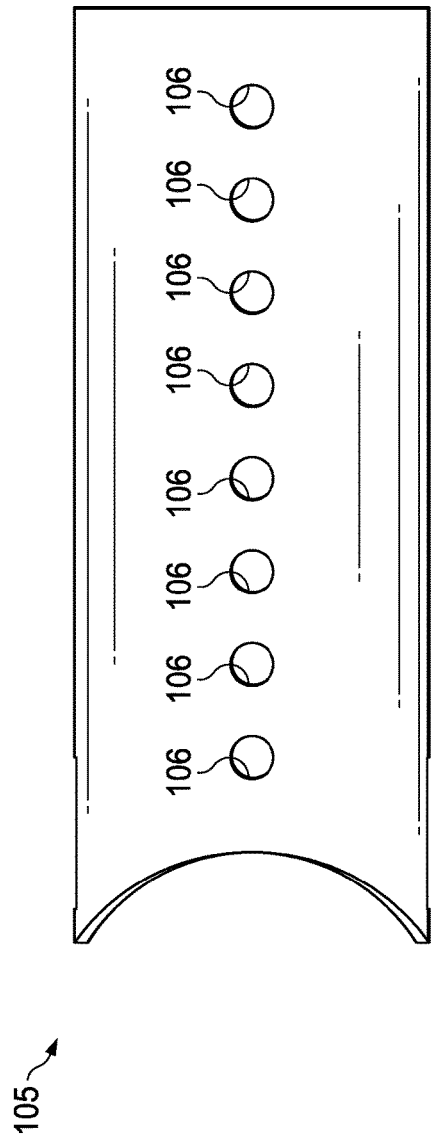
FIG. 24
FIG. 25

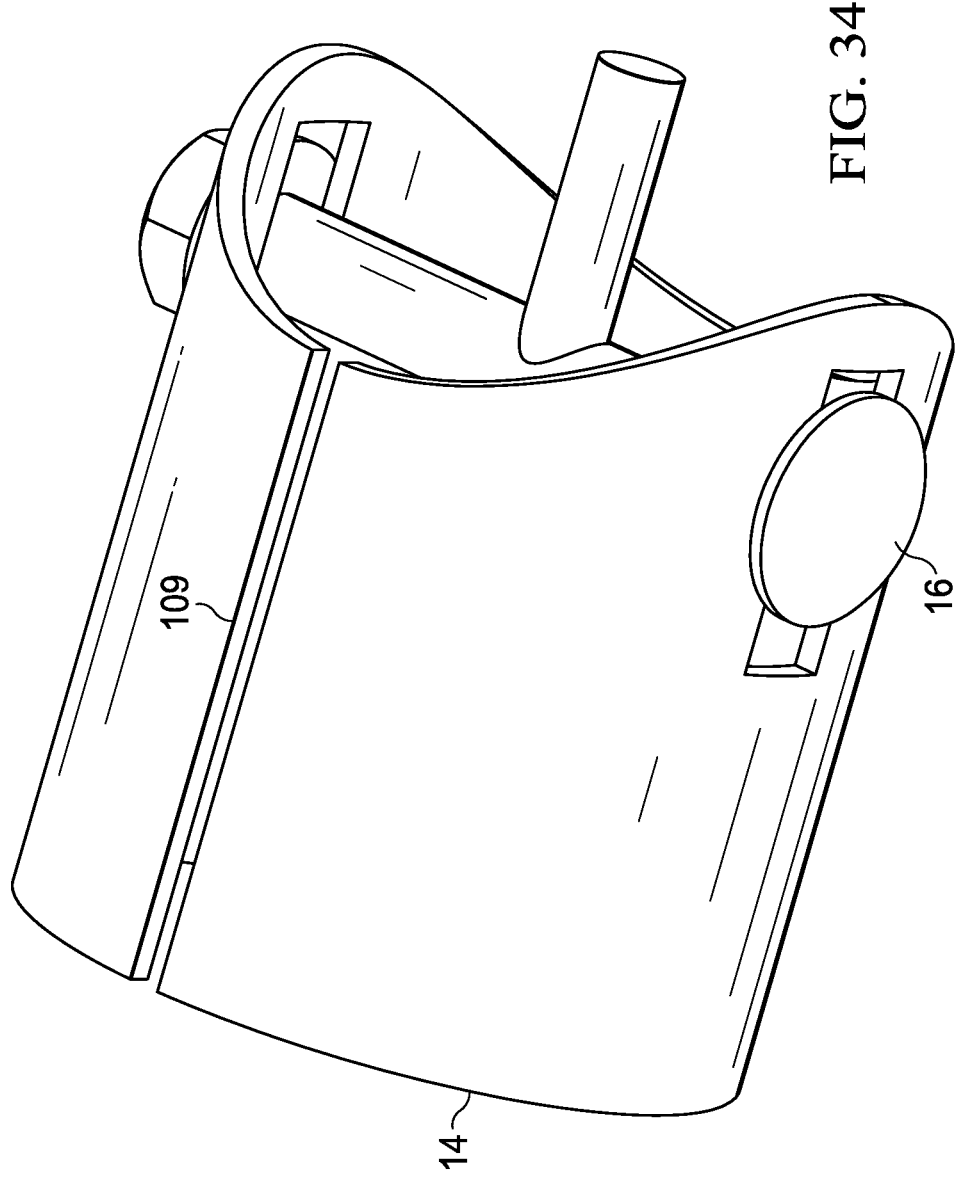

FENCE AND FENCE CONNECTION APPARATUS AND METHOD

RELATED CASE

This application claims the benefit of U.S. Provisional Patent Application Ser. No. 62/264,039 filed on Dec. 7, 2015 and incorporates said provisional application by reference into this document in its entirety as if fully set out at this point.

FIELD OF THE INVENTION

The present invention relates to fences, fence end brace assemblies, and fence corner brace assemblies having horizontal or angled rail or brace members formed of cylindrical pipe segments or formed of other conduits having any desired cross-sectional shape. The present invention also relates to apparatuses and methods which can be used for connecting such rail and brace members, without welding, to vertical fence posts formed of pipe, wood, or other materials.

BACKGROUND OF THE INVENTION

The use of pipe segments for constructing fences and fence end or corner braces continues to grow in popularity, particularly in areas where an abundant supply of used oil field pipe is readily available. Steel pipe of the type commonly used in oil field operations is sturdy and strong and is readily adaptable to form all manner of pipe fences which are durable, safe, and attractive, require little maintenance, and can increase the owner's property value. By way of example, but not by way of limitation, pipe fencing is used to form: livestock fences; property boundary fences; corrals; arenas; golf course fences; security enclosures for homes, farms, and businesses; etc.

Traditionally, pipe fences and fence braces have been constructed by installing vertical fence posts formed of metal pipe in the ground and then installing horizontal metal pipe rails and/or angled metal pipe brace members between the vertical posts by welding. Unfortunately, this has required the use of a portable welding machine and, in order to ensure that the pieces are welded correctly and to obtain a desirable professional look, has typically also required that the land owner hire a fence welding contractor.

Consequently, in addition to the expense which this creates, considerable impediments and delays in the construction of the pipe fence can occur as a result of: busy contractor schedules requiring that the work sometimes be contracted weeks or months in advance; the inability to transport the welding equipment and perform the work under wet or snow covered conditions; the fire danger inherent in performing welding operations in open areas under dry conditions; or possibly even a complete prohibition against such operations if, for example, a burn ban has been ordered by local authorities. Moreover, it will often be the case that the fence must extend through remote areas or over very rugged terrain where a welding machine cannot be taken.

In addition, another significant disadvantage of welded pipe fencing is that the welded fence is a permanent structure which cannot be dismantled without the use of destructive techniques. Consequently, once installed, the welded pipe fence (a) is difficult take apart and remove, (b) cannot be disassembled and reassembled in another location, and (c) is of little salvage value.

In view of the problems and disadvantages of having to use welded connections, some attempts have been made to develop "no-weld" connectors for pipe fences. However, the no-weld connectors developed heretofore have been deficient in various respects. Typically, the prior connectors have been cumbersome and difficult to use and have not been aesthetically pleasing. Also, the connectors have been stationary, single position connectors which can only be installed horizontally or at a fixed angle and/or require that the spacing of the fence posts and the cut length of the pipe rails or brace members be very precise.

Thus, a need exists for an improved pipe fence apparatus, an improve connector assembly for pipe fences, and an improved method of constructing pipe fences. The improved pipe fence and connector assembly will preferably: (1) not require welding or the services of a welding contractor; (2) provide the same benefits as a welded fence; (3) provide substantially the same or greater strength and durability as a welded fence; (4) be much easier and quicker to install; (5) accommodate a greater degree of variation in the spacing of the fence posts and the length of the individual pipe rails or braces in the event that such spacing or length is not precise; (6) be freely adaptable for installing the pipe rails or braces over a broad range of angles to accommodate a sloping terrain or for installing the member as either a horizontal rail or an angled brace; and (7) allow the fence to be easily disassembled and moved without damaging the rails, braces, or connection pieces.

SUMMARY OF THE INVENTION

The present invention provides (a) a no-weld fence or fence brace formed using cylindrical pipe segments or conduits having other cross-sectional shapes, (b) a connector assembly for connecting such fence rail and brace members to vertical posts, and (c) a method of constructing a fence or fence brace assembly using such fence rail and brace members. The inventive fence, connector, and method satisfy the needs and alleviate the problems discussed above. The inventive no-weld connector assembly can be used to connect pipe rail or brace members to vertical fence posts either horizontally or at any angle within a range of at least ±15°, at least ±20°, at least ±25°, and most preferably up to +28° or more. Thus, the universal nature of the inventive connector assembly for adapting to any desired angle eliminates the need, cost, and lead time required for obtaining specialized clamp pieces for installing the rail or brace members at specific angles needed for forming fence corner braces, following a sloping or hilly terrain, or for other purposes.

In addition, the inventive no-weld connector assembly is strong, durable, attractive, economical, and labor saving, is adaptable for accommodating imprecise post spacings or rail lengths, and requires only the use of a power drill and a wrench. Consequently, virtually anyone with minimal construction ability can use the inventive no-weld connector and construction method to (a) build a sturdy corner or end brace for a stretched wire fence or (b) construct a complex pipe rail fence, corral, or arena.

In one aspect there is provided a connector assembly for connecting a fence rail or brace member to a fence post, the connector assembly comprising: (a) an externally threaded attachment bolt or pin which is attachable to an upwardly extending fence post such that the externally threaded attachment bolt or pin will extend laterally with respect to the upwardly extending fence post and (b) an attachment sleeve which is slideably positionable on an end of an elongate fence rail or brace member, the attachment sleeve having a first side opening on a first laterally side of the attachment sleeve and an opposing second side opening on a second lateral side of the attachment sleeve.

The externally threaded attachment bolt or pin is preferably receivable by the attachment sleeve such that (i) a first end portion of the externally threaded attachment bolt or pin extends through the first side opening of the attachment sleeve, (ii) a second end portion of the externally threaded attachment bolt or pin extends through the opposing second side opening of the attachment sleeve, and (iii) the attachment sleeve can be pivoted on the externally threaded attachment bolt or pin to a selected position which can be perpendicular to the upwardly extending fence post or can be up to a maximum angle of at least ±15° from the position which is perpendicular to the upwardly extending fence post.

In addition, the connector assembly preferably further comprising at least one nut or other internally threaded attachment which is threadedly receivable on at least one of the first and the second end portions of the externally threaded attachment bolt or pin to lock the attachment sleeve in place on the externally threaded attachment bolt or pin at the selected position.

In another aspect, there is provided a connector assembly for connecting a fence rail or brace member to a fence post, the connector assembly comprising: (a) at least one hinge knuckle having a hinge passage extending therethrough, the hinge knuckle being attachable to an upwardly extending fence post such that the hinge passage of the hinge knuckle will extend laterally with respect to the upwardly extending fence post and (b) an attachment sleeve which is slideably positionable on an end of an elongate fence rail or brace member, the attachment sleeve having a first side opening in a first laterally side of the attachment sleeve and an opposing second side opening in a second lateral side of the attachment sleeve. The hinge knuckle is preferably receivable in a forward end of the attachment sleeve such that the hinge passage of the hinge knuckle is in alignment with the first and the second side openings of the attachment sleeve.

In addition, the connector assembly preferably further comprises a bolt or other externally threaded member which is receivable through the first side opening of the attachment sleeve, the hinge passage of the hinge knuckle, and the second side opening of the attachment sleeve such that (i) a distal portion of the bolt or other externally threaded member projects from the second side opening of the attachment sleeve and (ii) the attachment sleeve can be pivoted to a selected position which can be perpendicular to the upwardly extending fence post or can be up to a maximum angle of at least ±15° from the position which is perpendicular to the upwardly extending fence post. Also, the connector assembly preferably includes a nut or other internally threaded attachment which is threadedly receivable on the distal end portion of the bolt or other externally threaded member to lock the attachment sleeve in the selected position.

Further aspects, features, and advantages of the present invention will be apparent to those in the art upon examining the accompanying drawings and upon reading the following detailed description of the preferred embodiments.

BRIEF DESCRIPTION OF THE DRAWINGS

FIG. 9 is an elevational view of an alternative hinge screw 33 for the inventive connector assembly 10.

FIG. 10 is an elevational side view of the hinge screw 33.

FIG. 11 is an elevational view of an alternative threaded hinge pin 35 for the inventive connector assembly 10.

FIG. 13 is a side view of an externally threaded hinge knuckle member 42 used in the hinge collar assembly 34.

FIG. 14 is an end view of the hinge knuckle member 42.

FIG. 17 is a perspective view of an alternative two piece collar 56 for use in the hinge collar assembly 34.

FIG. 18 is a perspective view of a coped sleeve 14 used in the inventive connector assembly 10.

FIG. 19 is an elevational side view of the coped sleeve 14.

FIG. 20 is a top view of the coped sleeve 14.

FIG. 21 is an elevational end view of the coped sleeve 14.

FIG. 24 is an elevational side view of an alternative coped sleeve 105 for use in the inventive connector assembly 10.

FIG. 25 is a top view of the alternative coped sleeve 105.

FIG. 34 illustrates the use of a clamping slit 109 in the coped sleeve 14.

DETAILED DESCRIPTION OF THE PREFERRED EMBODIMENTS

Figure 1:
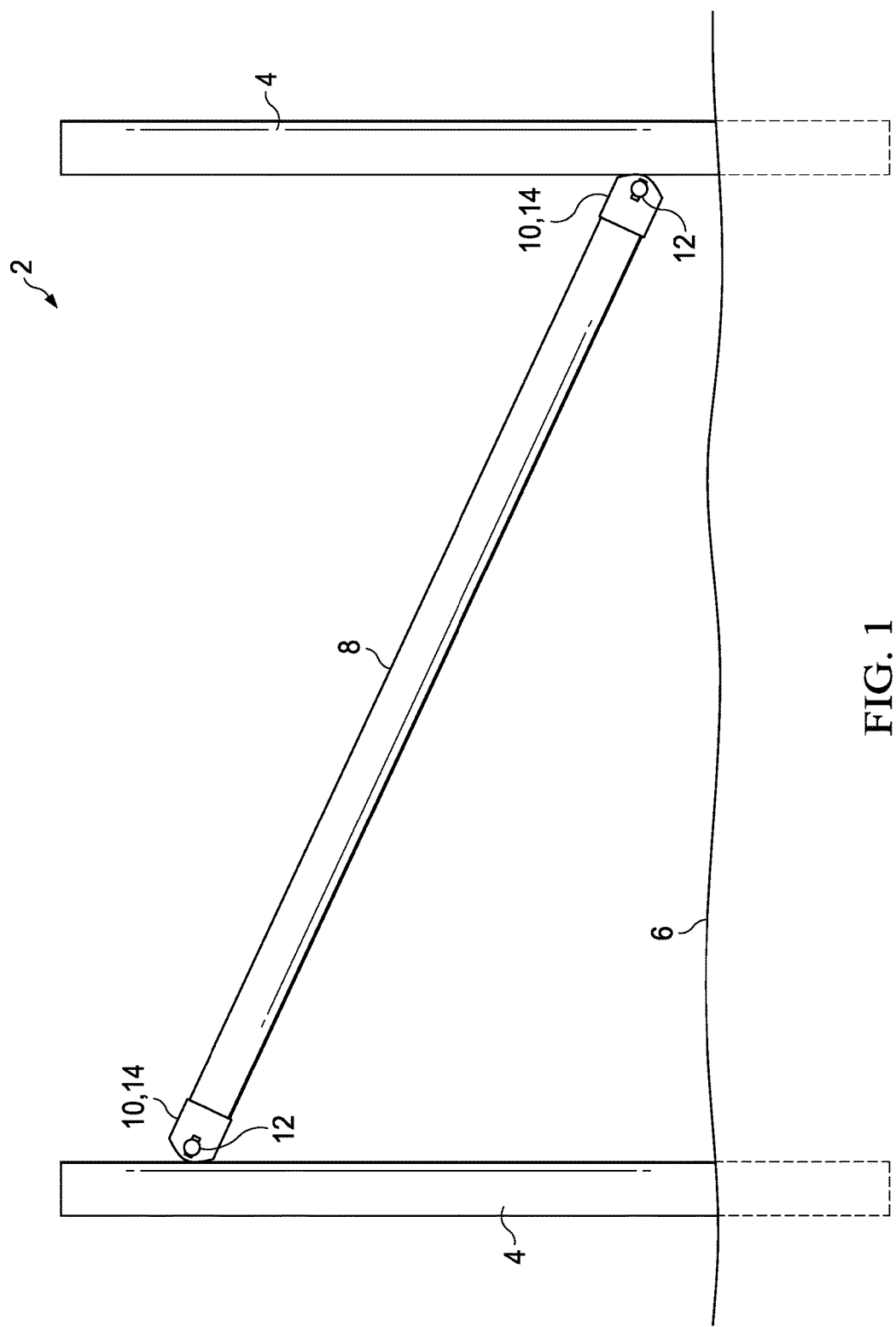
FIG. 1 is an elevational side view of an embodiment 2 of the inventive fence or fence brace provided by the present invention using an angled rail or brace member 8.
Figure 2:
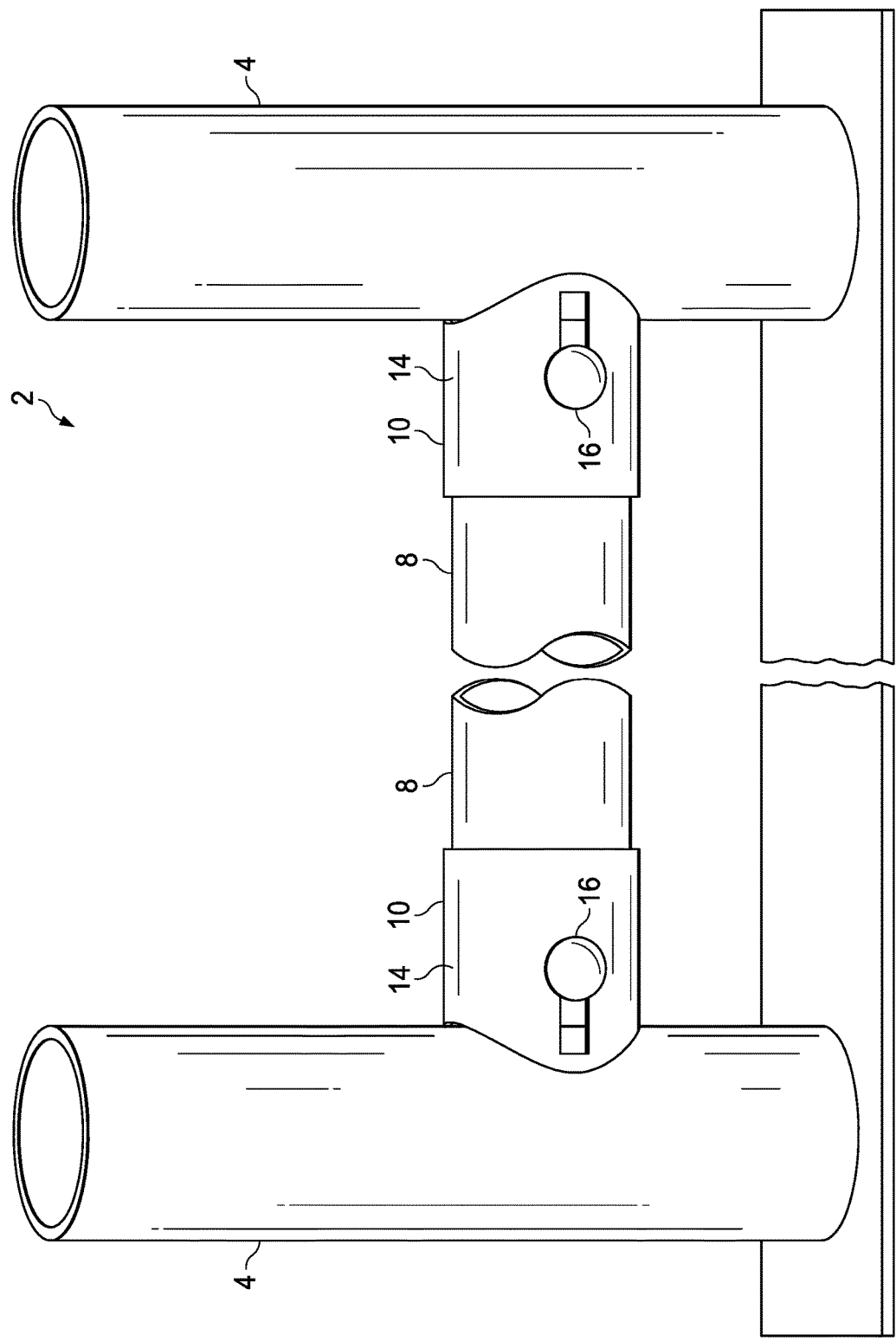
FIG. 2 is an elevational side view of the inventive fence or fence brace 2 provided by the present invention using a horizontal rail or brace member 8.
Figure 3:
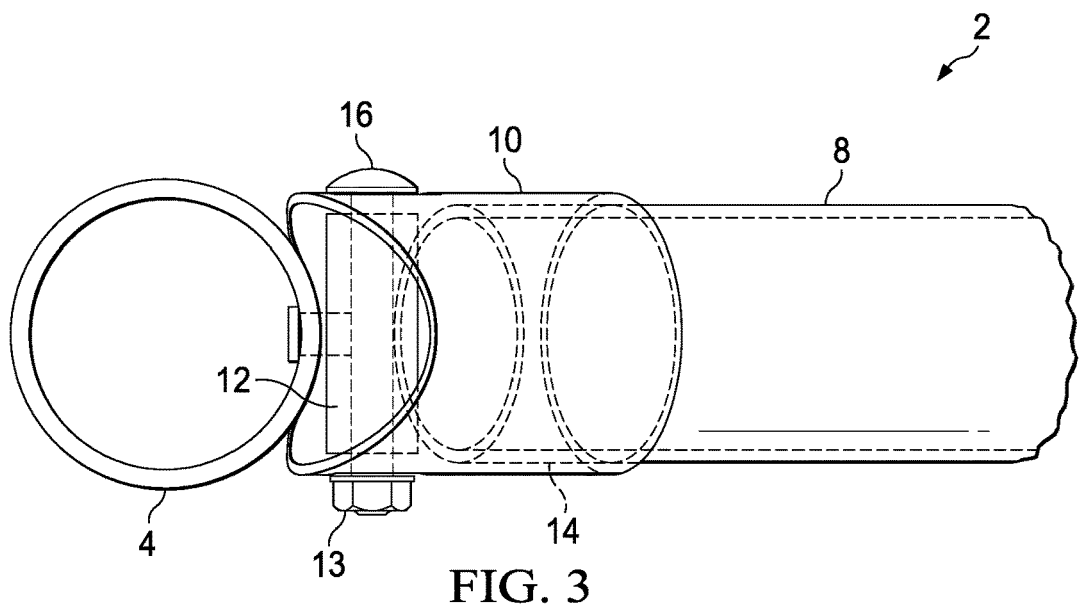
FIG. 3 is a top sectional view of the inventive fence or fence brace 2.
Figure 4:
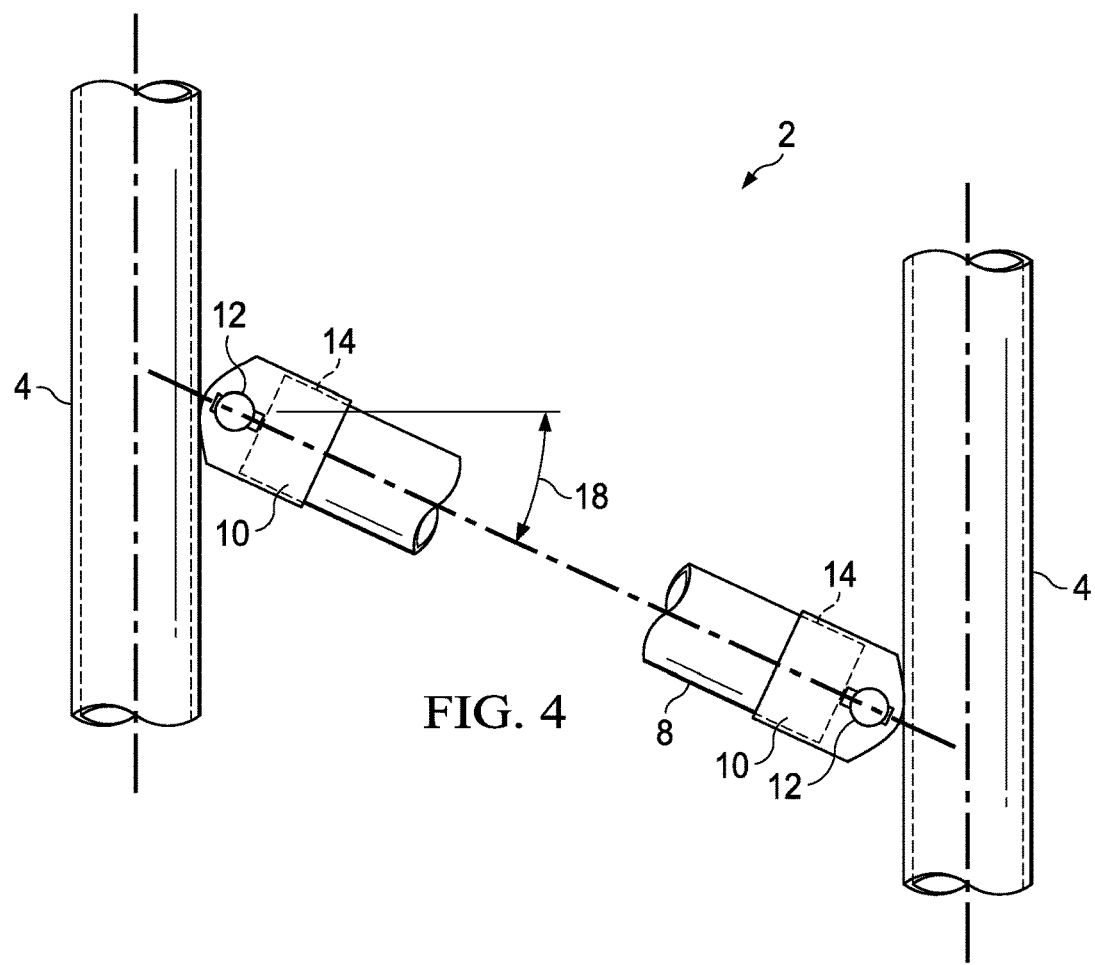
FIG. 4 is another elevational side view of the inventive fence or fence brace 2 using an angled rail or brace member 8.

An embodiment 2 of the inventive no-weld fence is illustrated in FIGS. 1-4. The no-weld fence 2 comprises: a plurality of vertical fence posts 4 which extend upwardly from the ground 6; one or more, typically a plurality, of pipe or other rail or brace members 8 which extend horizontally or at an angle between the vertical fence posts 4; and a plurality of inventive no-weld connector assemblies 10 which are used, in accordance with the inventive method of constructing the fence 2, to connect the rail and/or brace members 8 to the vertical fence posts 4.

The inventive no-weld connector assembly 10 preferably comprises: a hinge structure 12 which is connected to or installed on the fence post 4; a coped sleeve 14 which is slidable positioned on the rail or brace member 8 so that the end of the rail or brace member 8 will be nested within the coped sleeve 14; and an attachment pin or bolt 16 for pivotably connecting the coped sleeve 14 to the hinge piece 12.

As noted above, the inventive no-weld connector assembly 10 can be used to connect the rail and/or brace members 8 of a pipe fence either horizontally or at any angle 18 within a range of up to at least ±15°, at least ±20°, at least ±25°, and most preferably up to ±28° or more.

Figure 5:
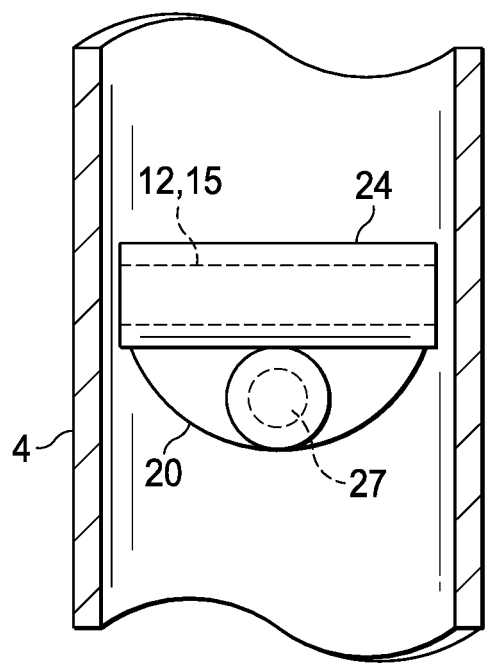
FIG. 5 is an elevational front view illustrating the use of a hinge piece 15 in the connector assembly 10 provided by the present invention.
Figure 6:
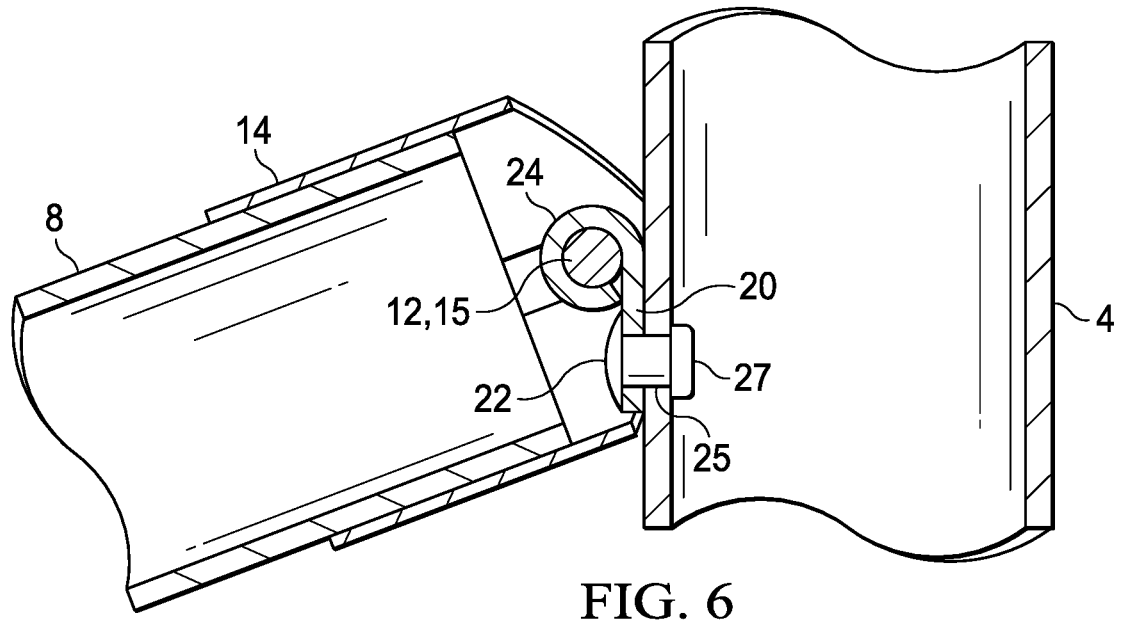
FIG. 6 is a cut away elevational side view illustrating the use of the hinge piece 15.

Various types of hinge structures 12 can be used for attaching the inventive no-weld connector 10 to a vertical fence post 4. By way of example but not by way of limitation, one type of structure 12 is a hinge piece 15 as illustrated in FIGS. 5 and 6. The hinge piece 15 comprises: a back portion 20; an attachment hole or slot 22 provided through the back portion 20; and a lateral hinge knuckle (or a series of two or more spaced apart hinge knuckles) 24 either attached to or integrally formed with the back portion 20 for receiving the hinge pin or bolt 16.

In accordance with the inventive construction method, if the vertical fence post 4 is a segment of pipe or other metal conduit, the hinge piece 15 can be attached to the fence post 4 by (a) aligning the attachment hole or slot 22 of the hinge piece 15 with a corresponding hole or slot 25 drilled or otherwise formed through the metal wall of the fence post 4 at a desired elevation and then (b) inserting and securing a bolt, a drive rivet, or other suitable attachment 27 through the aligned holes and/or slots 22 and 25. If, on the other hand, the fence post 4 is a wooden post, a screw can be inserted through the attachment hole or slot 22 of the hinge piece 15 and screwed into the post 4. The hinge piece 15 can be selectively attached to the fence post 4 such that the hinge knuckle 24 is either above or below the attachment hole or slot 22 of the hinge piece 15.

Figure 7:
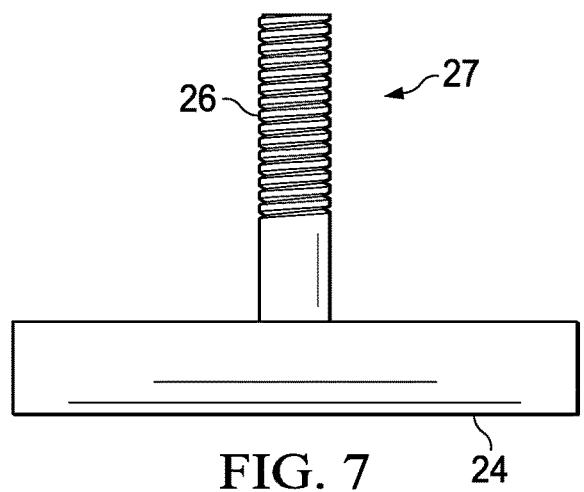
FIG. 7 is an elevational view of an alternative threaded hinge pin 27 for the inventive connector assembly 10.
Figure 8:
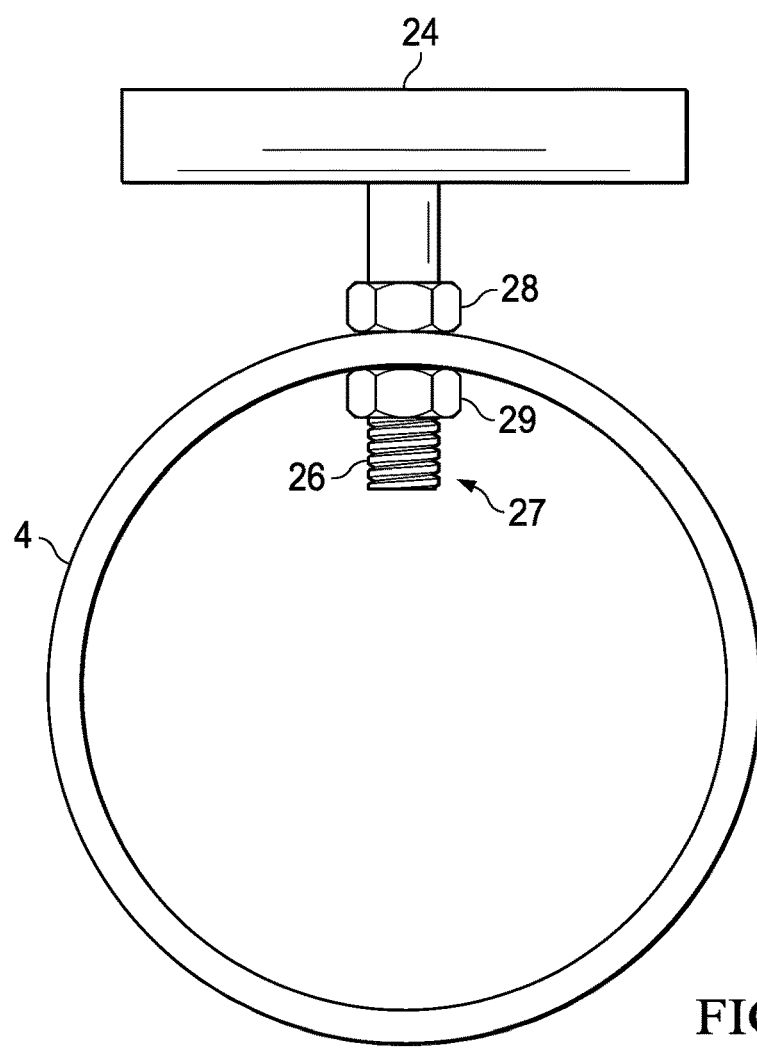
FIG. 8 is a top view illustrating the connection of the threaded hinge pin 27 to a pipe fence post 4.

An example of another hinge structure 12 which can be used for pivotably connecting the inventive no-weld connector assembly 10 to a vertical fence post 4 formed of pipe or other metal conduit is the threaded hinge pin 27 shown in FIGS. 7 and 8. The threaded hinge pin 27 is a T-shaped structure comprising (a) a threaded pin segment 26 which is inserted through the hole or slot 25 formed through the wall of the metal fence post 4 for threaded attachment using a nut 29 positioned inside the fence post 4 and (b) a lateral hinge knuckle 24 provided on the outer end of the pin segment 26. By way of example, the lateral hinge knuckle 24 can be a short segment of small diameter pipe or metal cylindrical structure which is attached to the outer end of the pin segment 26 by welding.

FIG. 8 illustrates the use of the threaded hinge pin 27 to (a) assist in accommodating some variation in the space between fence posts 4 and/or the length of the horizontal or angled rail or brace members 8 and/or (b) move the connection pivot point outwardly to allow the connection angle between the rail or brace member 8 and the fence post 4 to be increased. To move the pivot point of the hinge pin 27 outwardly to a desired degree while maintaining a secure connection between the fence post 4 and the inventive no-weld connector assembly 10, one or more nuts, washers, and/or other appropriately sized spacers 28 can be positioned on the threaded segment 26 of the hinge pin 27 between the lateral hinge knuckle 24 and the outer wall of the fence post 4.

An example of another hinge structure 12 which can be used for pivotably connecting the inventive no-weld connector assembly 10 to a wooden fence post 4 is the hinge screw 33 shown in FIGS. 9 and 10. The hinge pin 33 is a T-shaped structure comprising (a) a threaded screw segment 30 which is screwed into the wooden fence post 4 and (b) a lateral hinge knuckle 24 attached to the outer end of the screw segment 30, e.g., by welding. As will be apparent, the pivot point of the hinge screw 33 can also be moved outwardly by using one or more nuts, washers, or other appropriately sized spacers between the lateral hinge knuckle 24 and the outer wall of the fence post 4.

An example of yet another hinge structure 12 which can be used for pivotably connecting the inventive no-weld connector assembly 10 to a fence post 4 formed of pipe or other metal conduit is the hinge pin 35 shown in FIG. 11. The hinge pin 35 is a T-shaped structure comprising (a) a straight pin segment 32 of cylindrical or any other desired cross-sectional shape which is inserted through the hole or slot 25 formed through the wall of the vertical fence post 4 and (b) a lateral hinge knuckle 24 attached to the outer end of the pin segment 32, e.g., by welding. The hinge pin 35 will be held in connection with the fence post 4 by a compressive force exerted on the hinge pin 35 by the rail or brace member 8 and the inventive connector assembly 10 after the installation of rail or brace member 8 has been completed.

An example of another hinge structure 12 which can be used for pivotably connecting the inventive no-weld connector assembly 10 to a pipe type fence post 4 is the hinge collar assembly 34 illustrated in FIGS. 12a-15. The hinge collar assembly 34 comprises: a band (e.g., a C-clamp) or other collar 36 including a body portion 38 having a semicircular or other shape which corresponds to the cross-sectional shape of the fence post 4; a pair of opposing, spaced apart clamping arms 40 which project outwardly from the body portion 38 of the band 36; and a hinge knuckle member 42 which is preferably laterally receivable through matching holes or slots 44 provided in the opposing clamping arms 40.

The hinge knuckle member 42 used in the hinge collar assembly 34 preferably comprises a cylindrical member (e.g., a short segment of small diameter pipe or tubing) having (a) threads 48 formed in the exterior of the cylindrical member 42 extending from end to end and (b) a cylindrical passage 50 which extends through the cylindrical member 42.

Figure 12A:
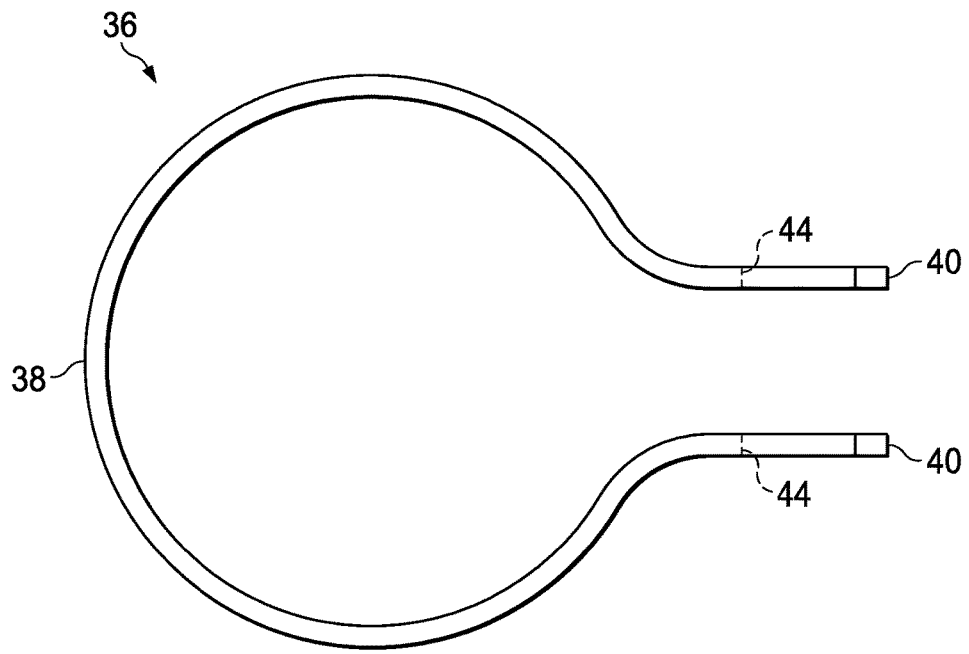
FIG. 12a is a top view of a band 36 used in an alternative hinge collar assembly 34 for the inventive connector assembly 10.
Figure 12B:
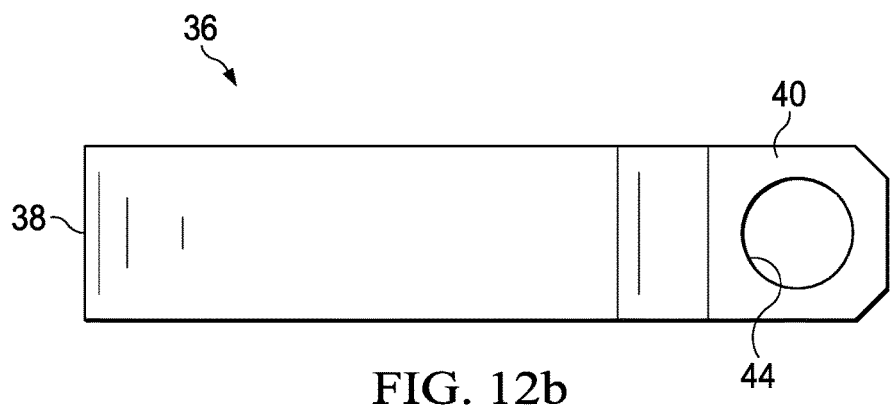
FIG. 12b is an elevational side view of the band 36.
Figure 16:
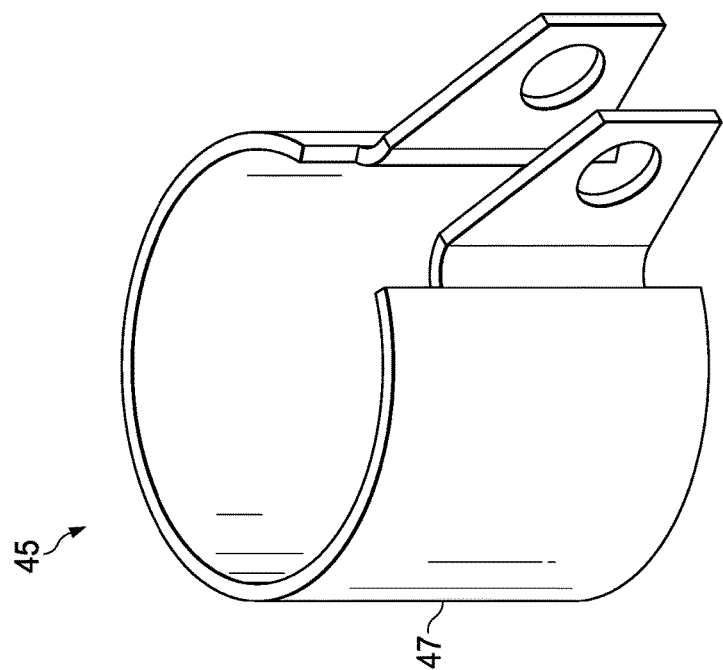
FIG. 16 is a perspective view of an alternative stacking band 45 for use in the hinge collar assembly 34.
Figure 15:
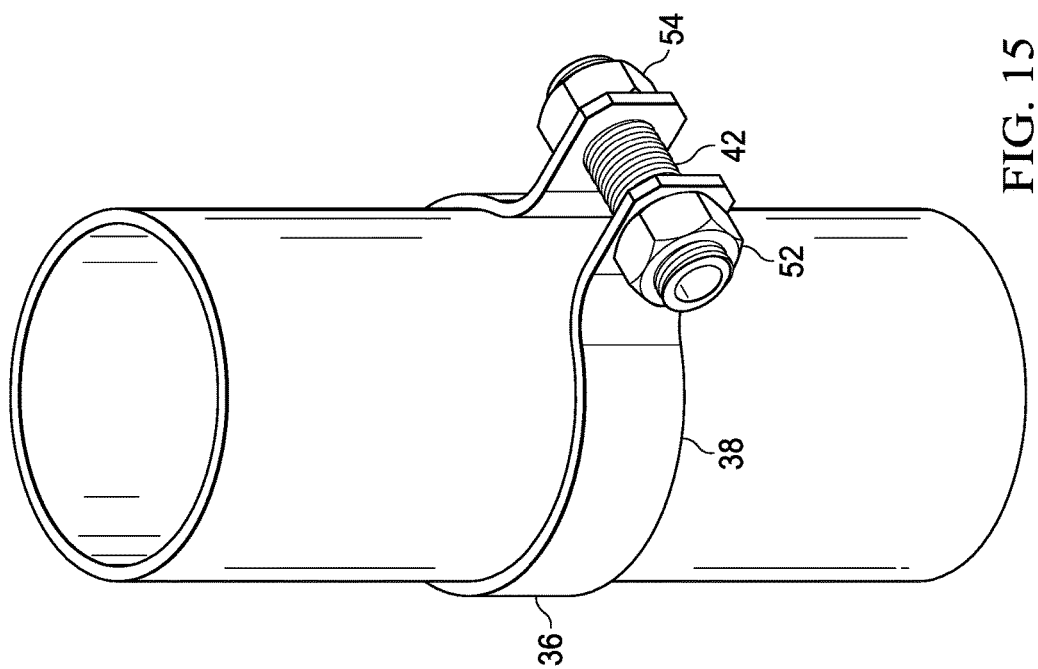
FIG. 15 is a perspective view of the hinge collar assembly 34.
Figure 22:
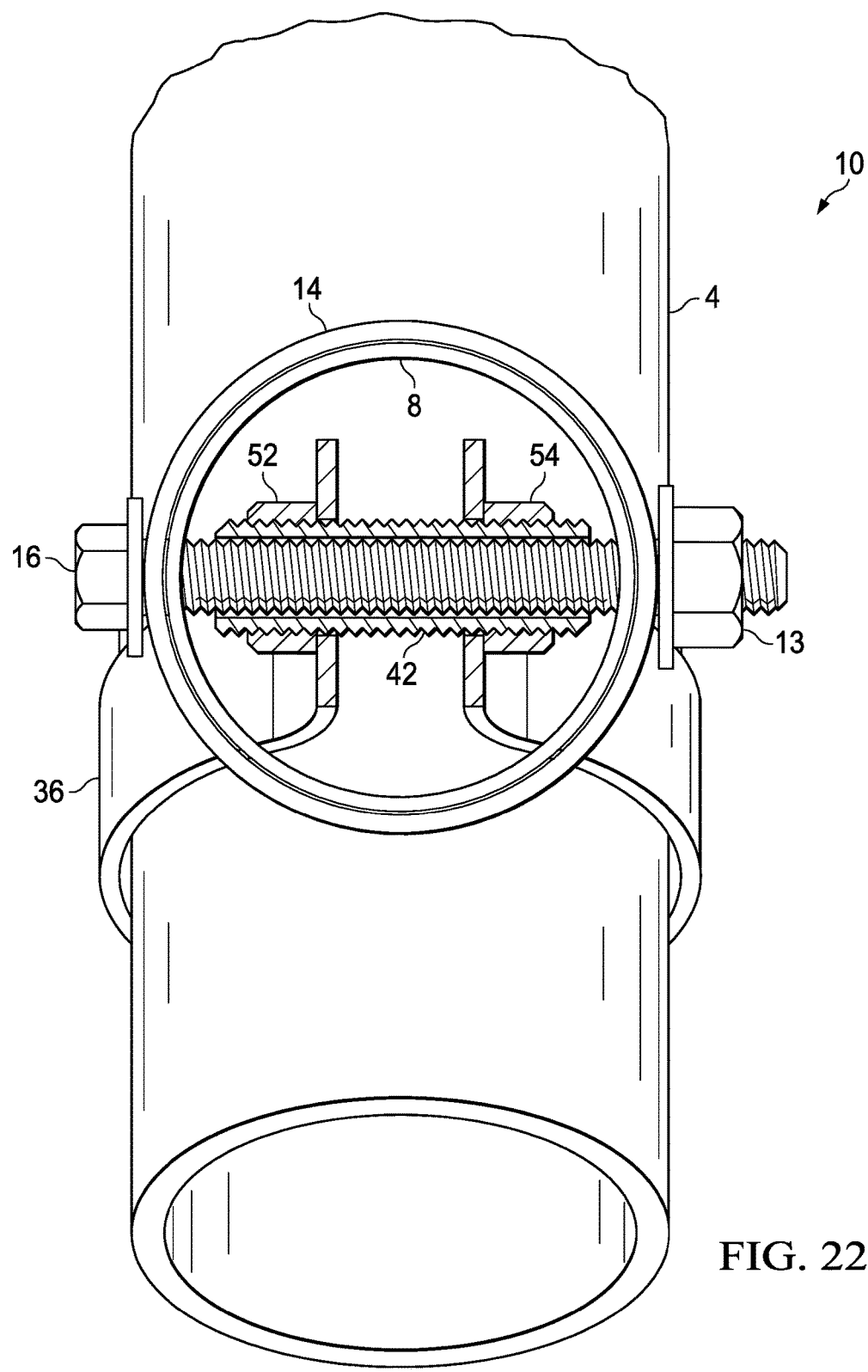
FIG. 22 is a cutaway cross-sectional end view of the inventive connector assembly 10.
Figure 23:
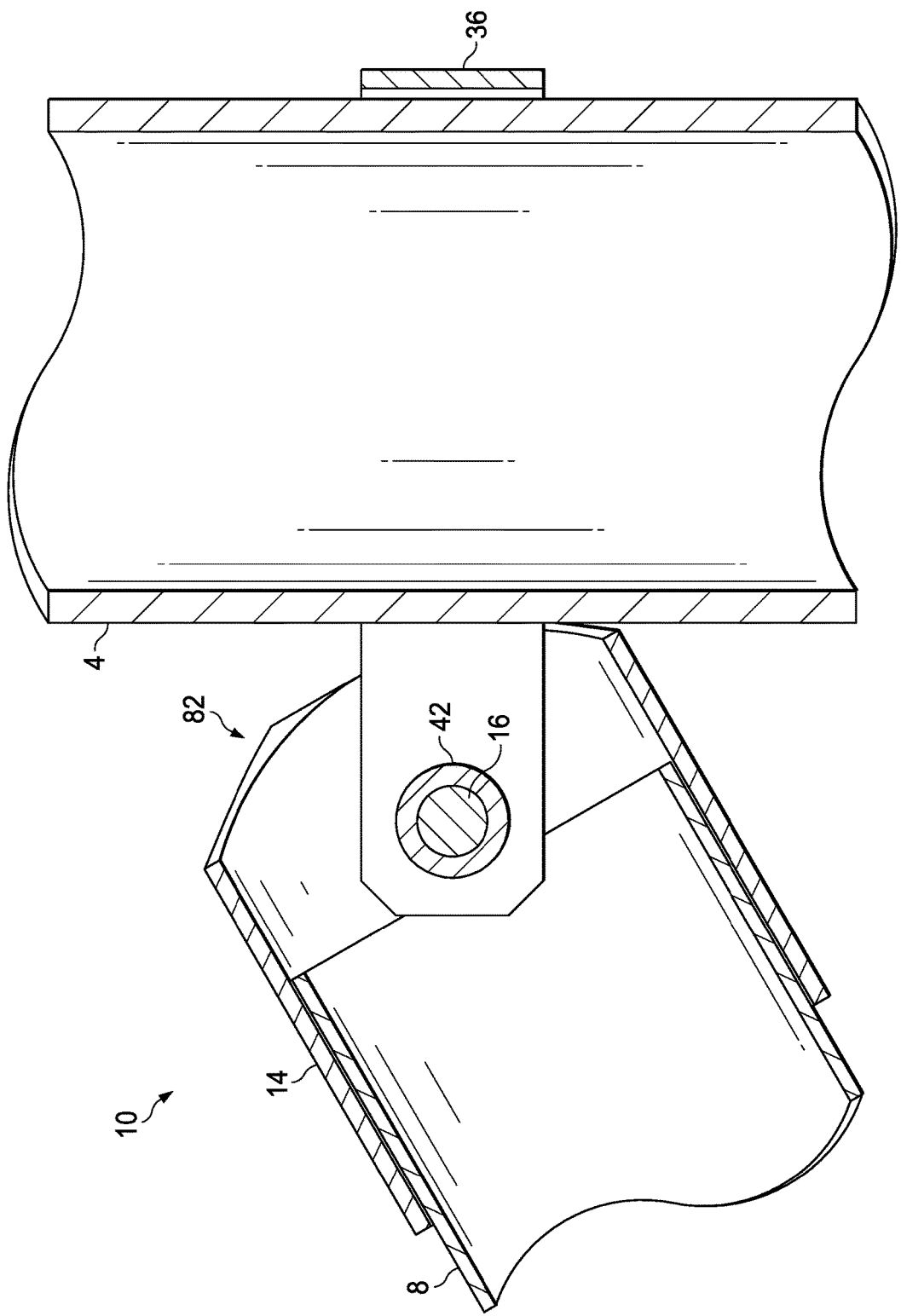
FIG. 23 is a cutaway elevational side view of the inventive connector assembly 10.
Figure 36:
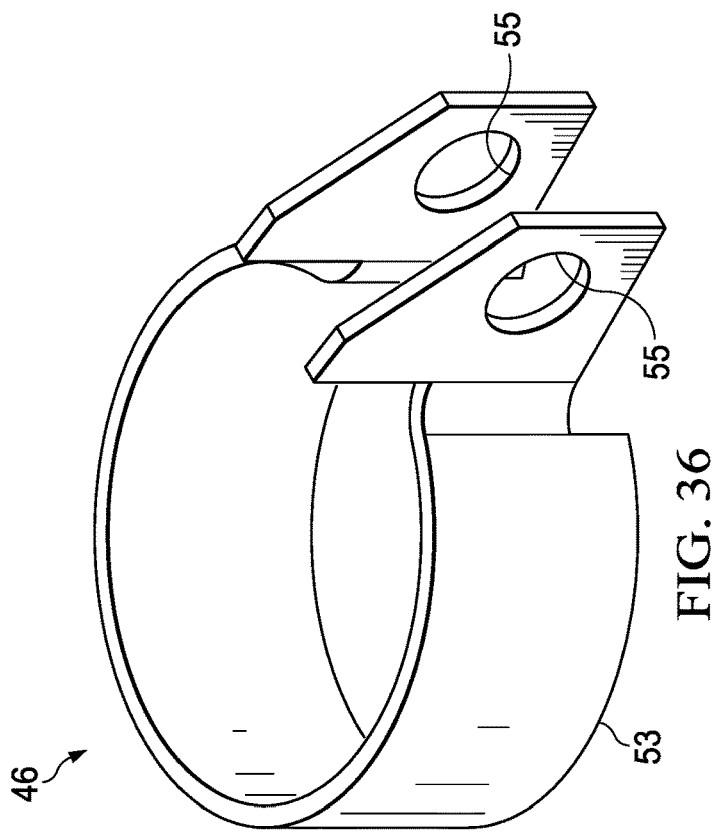
FIG. 36 is a perspective view of an alternative stacking band 46 for use in the hinge collar assembly 34.

As an alternative to the clamping band 36 illustrated in FIGS. 12a, 12b, and 15, stacking bands 45 or 46 which are also well suited for use in the hinge collar assembly 34 are illustrated in FIGS. 16 and 36. As seen in FIGS. 16 and 36, the semicircular body 47 or 53 of the stacking band 45 or 46 can be of any desired longitudinal length, typically in the range of from 0.5 to 6 inches. Tall stacking bands 45 of the type shown in FIG. 16 can be used, for example, at the terminal end of a fence or brace and will allow the coped sleeve of the inventive connector assembly 10 to be coped at a radius of curvature corresponding to the outside radius of the body 47 of the stacking band 45. The shorter stacking band 46, on the other hand, is well suited for stacking a pair of the bands 46 wherein one of the bands is flipped over and the attachment holes 55 of the two bands 46 are positioned as needed for installing hinge knuckle members 42 therein at the same height on opposite sides of the fence post 4.

In accordance with the method of the present invention, the hinge collar assembly 34 can be installed on a fence post 4 by: placing the body portion 38 or 47 of the band 36 or 45 on the fence post 4 at an elevation at which the attachment of the rail or brace member 8 to the fence post 4 is desired; inserting the externally threaded hinge knuckle member 42 through the holes or slots 44 provided in the clamping arms 40 of the band 36 or 47; placing nuts 52 and 54 on each end of the threaded exterior 48 of the hinge knuckle member 42; and tightening the nuts 52 and 54 on each end of the hinge knuckle member 42 until the band 36 or 47 is securely clamped on the fence post 4.

An example of yet another alternative collar which can be used in the hinge collar assembly 34 in place of the above-described band 36 is the two piece collar 56 which is shown in FIG. 17. The alternative collar 56 is a two piece collar comprising matching collar pieces 58 and 60 which together form: a central portion 62 of round or other desired shape for placement around the fence post 4; a pair of opposing forward spaced apart clamping arms 64 and 66 having holes or slots 68 and 70 formed therethrough; and a pair of opposing rearward spaced apart clamping arms 72 and 74 having holes or slots 76 and 78 formed therethrough.

In accordance with the method of the present invention, when using the alternative two piece collar 56 in the hinge collar assembly 34, the hinge collar assembly can be installed on a fence post 4 by: inserting a bolt through the holes or slots 76 and 78 of the reward clamping arms 72 and 74 and threading a nut onto the bolt to retain the rearward clamping arms 72 and 74 together at any desired amount of spacing therebetween; sliding the joined collar pieces 58 and 60 down the fence post 4 to an elevation at which the attachment of the rail or brace member 8 to the fence post 4 is desired; inserting an externally threaded hinge knuckle member 42 through the holes or slots 68 and 70 provided in the forward clamping arms 64 and 66; placing nuts 52 and 54 on each end of the threaded exterior 48 of the hinge knuckle member 42; and tightening the nuts 52 and 54 on each end of the hinge knuckle 42 until the two piece collar 56 is securely clamped on the fence post 4.

Alternatively, the two piece collar 56 can be used to also attach a second rail or brace member 8 to the opposite side of the post 4 by (a) using a first externally threaded hinge knuckle member 42 to join the forward clamping arms 64 and 66 of the two piece collar 56 together as described above and (b) using a second externally threaded hinge knuckle member 42 to join the rearward clamping arms 72 and 74 of the two piece collar 56 together in the same manner.

The coped sleeve 14 used in the inventive no-weld connector assembly 10 has a cross-sectional shape which (a) corresponds to the cross-sectional shape of the fence rail or brace member 8 and (b) is larger than that of the rail or brace member 8 so that the coped sleeve 14 can be slideably received on the rail or brace member 8. Consequently, when the rail or brace member is a segment or length of pipe, the coped sleeve 14 will be a cylindrical member, typically a piece of a slightly larger diameter pipe, such that the inside diameter of the coped sleeve 14 is at least slightly greater than the outside diameter of the pipe rail or brace member 8.

A cylindrical coped sleeve 14 for placement on a pipe rail or brace member 8 is illustrated in FIGS. 18-21. The coped sleeve 14 comprises: a cylindrical body 80; a coped forward attachment end 82; and pair of opposing holes or slots 84 and 86 provided through the lateral side walls of the body 80. The coped end 82 provides a significant range of motion as mentioned above which allows the inventive connector assembly 10 and the rail or brace member 8 to be freely pivoted over a wide range of possible attachment angles. At the same time, the coped end 82 provides a snug, attractive fit against the exterior of the fence post 4 which further assists in providing a strong attachment and minimizes the presence of exposed edges, catchments or other possible hazards.

Although other types of cuts can also be used, the coped forward attachment end 82 of the sleeve 14 is preferably formed by making a semicircular or near semicircular cut 88, as seen from a top view of the sleeve 14 as shown in FIG. 20, in the forward end 82 of the sleeve body 80. The radius of curvature 90 of the semicircular cut 88 will preferably be substantially the same, more preferably the same as or slightly larger, than the outside cross-sectional radius 92 of the vertical fence post 4 (or of a stacking collar 45 secured on the fence post if a wide stacking collar 45 is used) to which the sleeve 14 will be attached. This allows the coped end 82 to closely mate with the exterior of the fence post 4, while maintaining a wide range of possible attachment angles, and provides forwardly projecting side attachment ears 94 and 96 which allow the length and adjustability of the side attachment slots 84 and 86 to be increased.

In accordance with the method of the present invention, and as illustrated in FIGS. 1-6, 22 and 23, the sleeve 14 of the inventive connector assembly 10 is used for securing a rail or brace member 8 on a vertical post 4 by: (a) placing the coped sleeve 14 on the end of the rail or brace member 8 such that the end of the rail or brace member 8 is nested in the sleeve 14 and the coped end 82 of the sleeve 14 faces the vertical post 4; (b) aligning the side attachment holes or slots 84 and 86 of the sleeve 14 with the cylindrical hinge passageway 50 of the lateral hinge knuckle 24 or 42 of any of the hinge structures 15, 27, 33, 34, or 35 described above; (c) extending a bolt or pin 16 through the holes or slots 84 and 86 of the sleeve 14 and the cylindrical hinge passageway 50 of the hinge knuckle 24 or 42; (d) using the hinge attachment formed by the bolt or pin 100 and the hinge knuckle 24 or 42 to pivot the rail or brace member 8 to a horizontal position or upwardly or downwardly to any other desired angle of attachment; (e) if the side attachment openings 84 and 86 of the sleeve 14 are slots, positioning the hinge bolt or pin 16 at any desired position along the length of the slots 84 and 86 to change the pivot point of the connection and/or to account for possible variations in the spacing between adjacent fence posts 4 and/or the lengths of the rail or brace members 8; and then (f) tightening a nut 13 on the hinge bolt 16 or otherwise securing the bolt or pin 16 to removably secure the connection assembly 10 at the elected pivot point and angle.

When using the hinge structure 15 or 34, the hinge structure 15 or 34 will preferably be installed on the vertical post 4 before attaching the sleeve 14 to the hinge knuckle 24 or 42. However, when using any of the hinge pins 27, 33 or 35, sleeve 14 can be attached to the hinge knuckle 24 either after or before the hinge pin 27, 33 or 35 is installed on the vertical post 4.

An alternative coped sleeve 105 which can be used in the inventive connector assembly 10 is illustrated in FIGS. 24 and 25. The coped sleeve 105 is identical to the coped sleeve 14 except that the coped sleeve 105 preferably has a greater longitudinal length and also has one or a plurality, preferably a series, of holes 106 provided through the top, and preferably also the bottom, of the sleeve 105. When using sleeve 105, one or more holes can also be provided through the rail or brace member 8 for using a pin or bolt to lock the sleeve 105 in any desired extended or retracted longitudinal position on the end of the rail or brace member 8. Alternatively, in the case of a compression connection, the pin or bolt can simply be inserted through a selected hole or pair of holes 106 in the sleeve 105 forwardly of the end of the rail or brace member 8 to stop the end of the rail or brace member 8 at its desired compression insertion point in the sleeve 105.

As yet another alternative means of securing the coping sleeve on the end of the rail or brace member 8, a longitudinal slit 109 can be formed along the length of the top or bottom of the sleeve 14 as illustrated in FIG. 34 so that the sleeve 14 will compress and clamp the end of the rail or brace member 8 when the bolt attachment 16 for the sleeve 14 is tightened.

Figure 35:
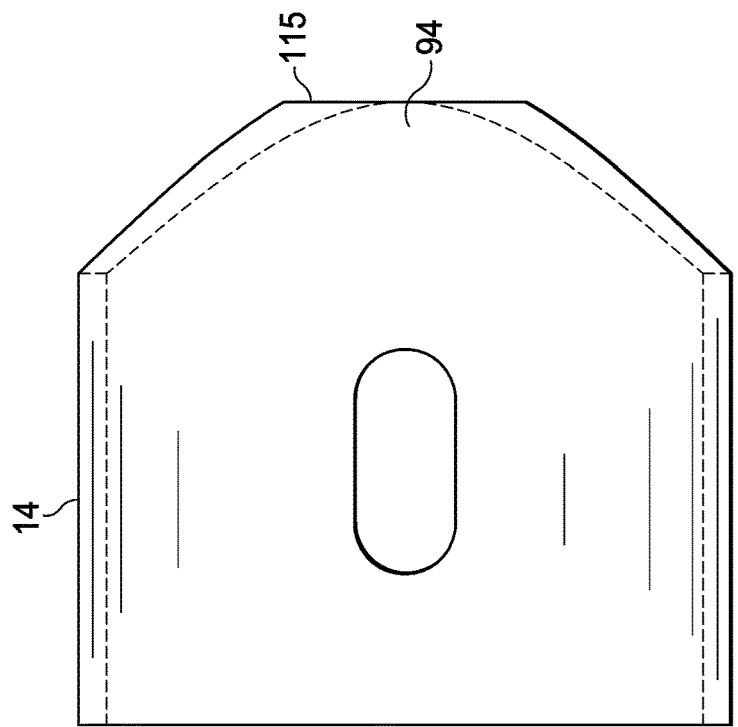
FIG. 35 is an elevational side view of an embodiment of the coped sleeve 14 having cropped forward projections 115.
Figure 38:
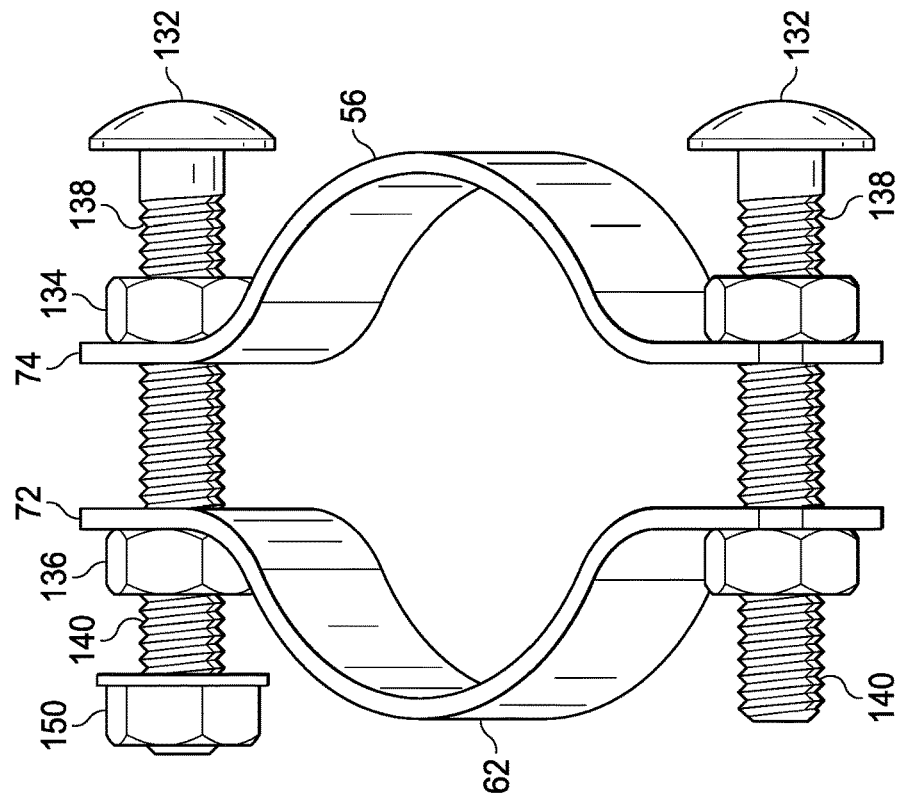
FIG. 38 is a top view of the two piece collar 56 as used in the alternative connector assembly 130.
Figure 37:
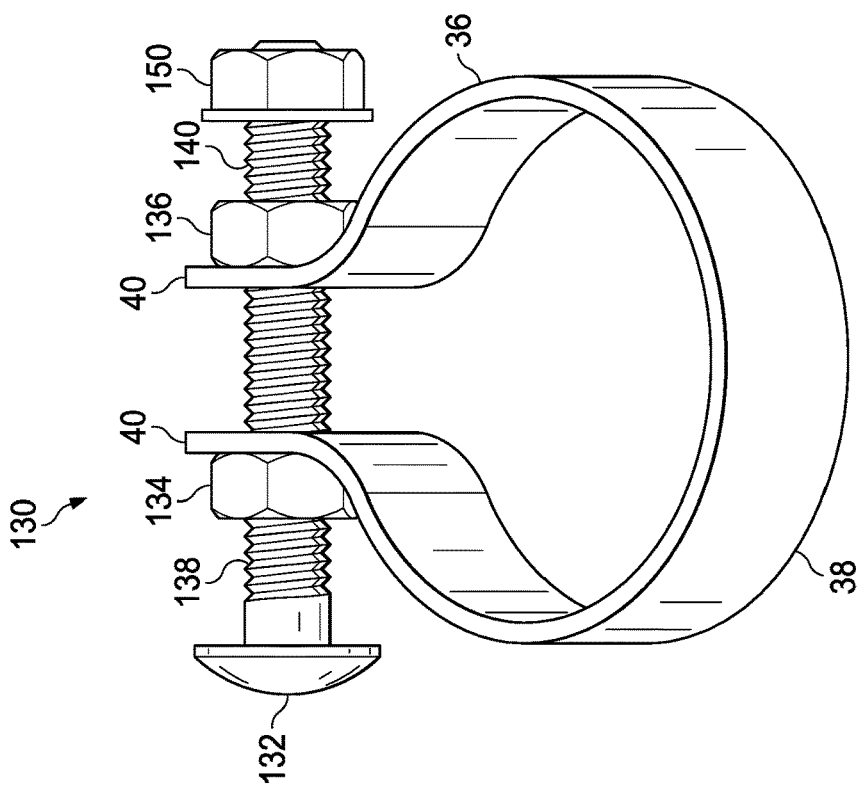
FIG. 37 is a top view of the collar 36 as used in an alternative embodiment 130 of the no-weld connector assembly.
Figure 40:
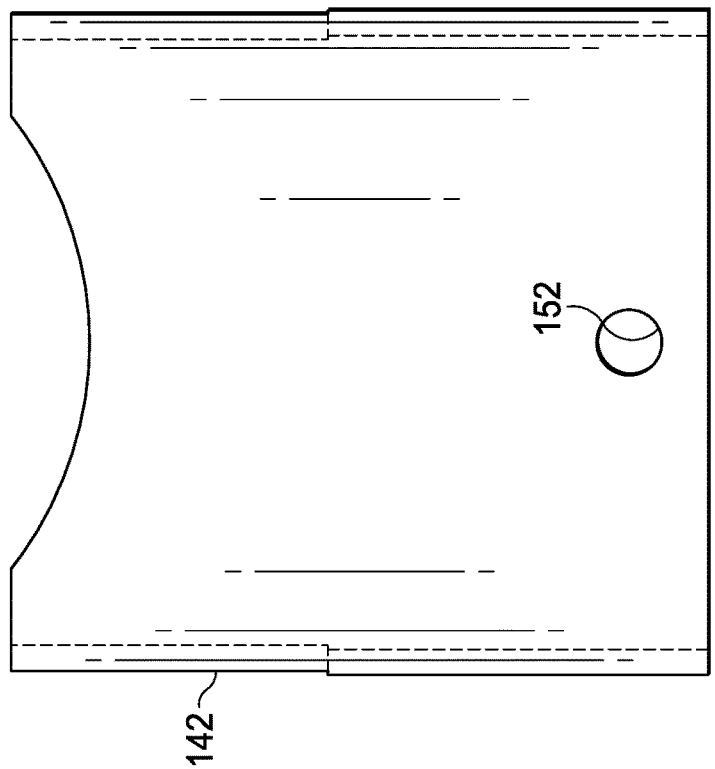
FIG. 40 is an elevational side view of the coped sleeve 142 rotated 90°.
Figure 39:
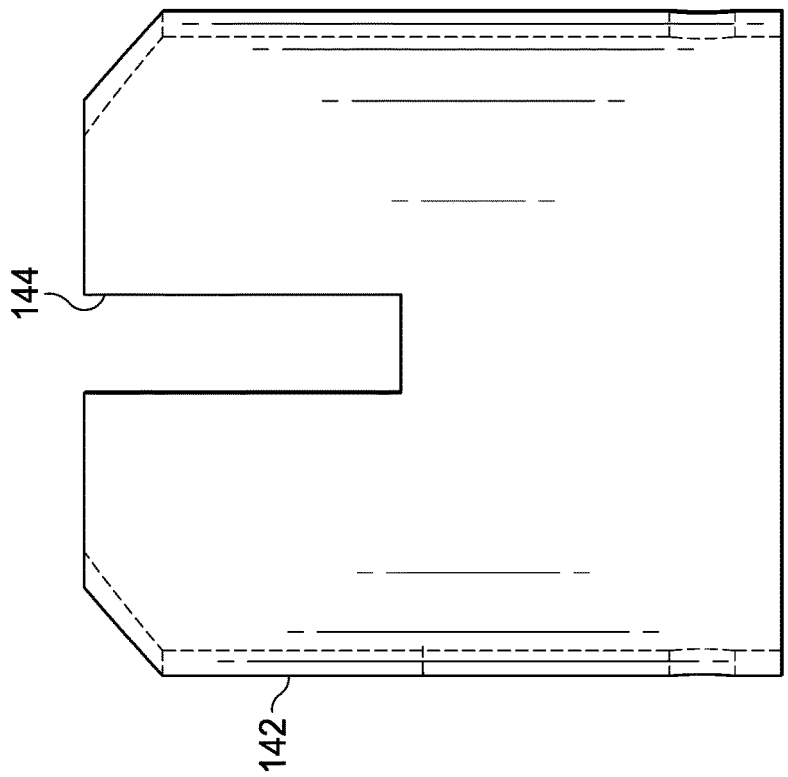
FIG. 39 is an elevational side view of a coped sleeve 142 used in the alternative connector assembly 130.
Figure 41:
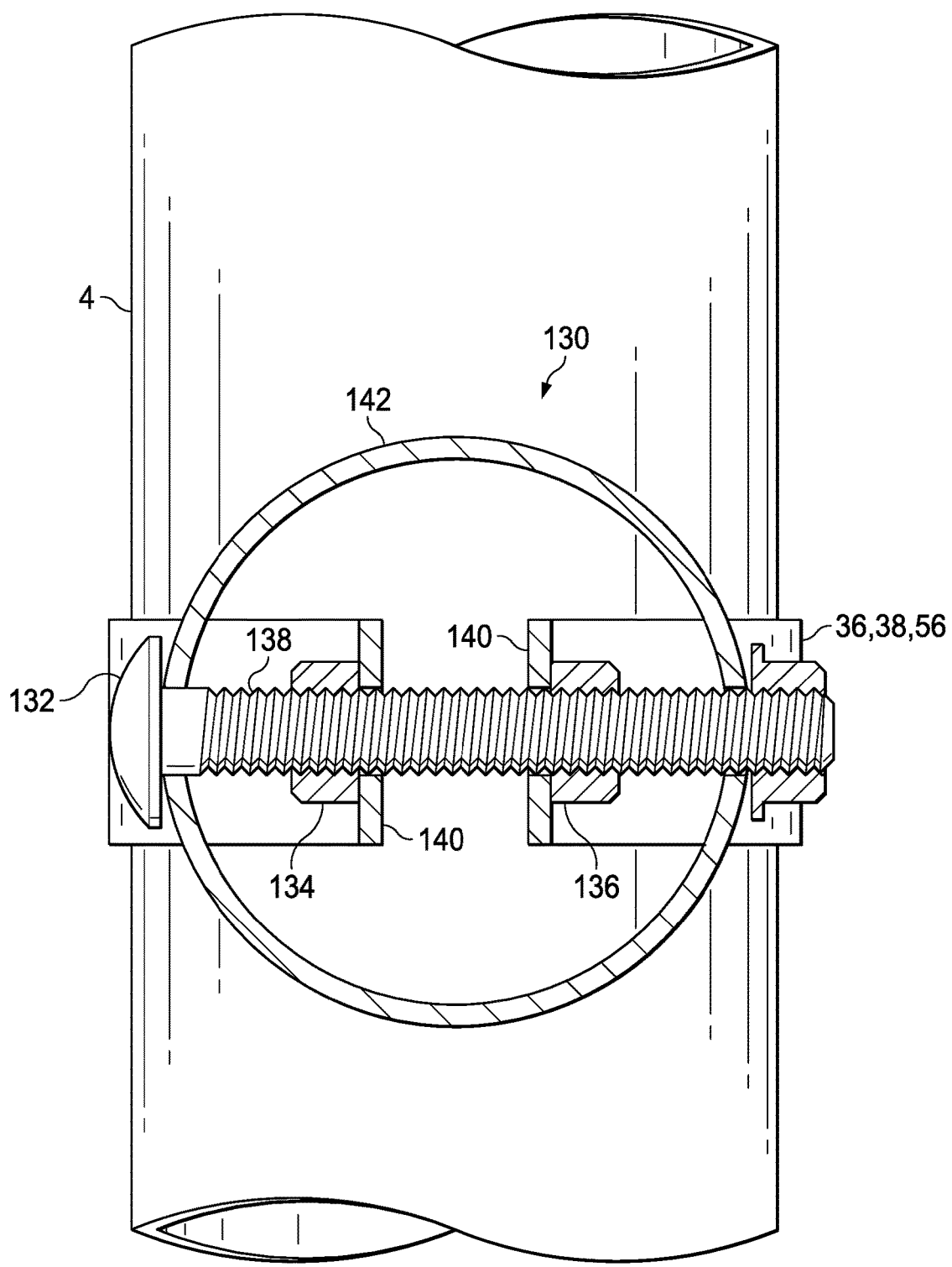
FIG. 41 is a cutaway elevational view illustrating the collar 36 or the two piece collar 56 as installed on a fence post 4 for use in the alternative connector assembly 130.
Figure 42:
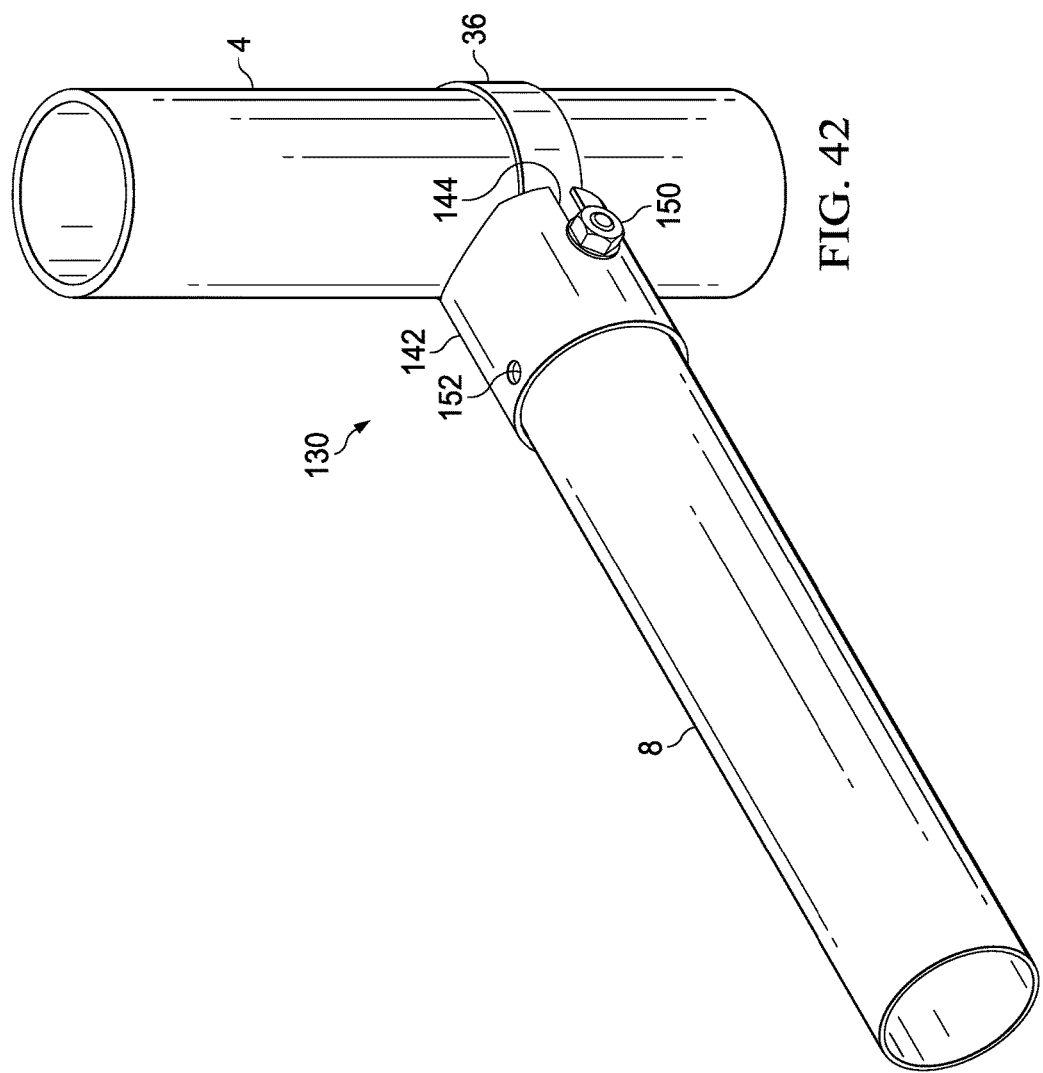
FIG. 42 is a perspective view of the alternative connector assembly 130.

In addition, when a hinge band or collar 36, 45 or 56 is used in the inventive connector assembly 10, the forward ends 115 of the forwardly projecting side attachment ears 94 and 96 of the coped sleeved 14 can be cropped, e.g., cut flat as illustrated in FIG. 35, so that (a) the forward ends 115 of sleeve side attachment ears 94 and 96 can mate flushly against or in close proximity to the band or collar 36, 46, or 56 when the sleeve 14 is in horizontal position while also (b) preventing the band or collar 36, 46, or 56 from interfering with the pivoting range of motion of the sleeve 14 for installing the rail or brace member 8 at other angles. The width of the cropped end 115 will preferably match the width of the band or collar 36, 45, or 56 to which the sleeve 14 is attached.

An alternative embodiment 130 of the inventive no-weld connector assembly is illustrated in FIGS. 37-42. The no-weld connector assembly 130 (a) can use the same hinge collar 36, or stacking collar 45 or 46, as described above for securing a rail or brace member 8 either horizontally or at any desired angle on one side of a fence post 4 or (b) can use the same two piece collar 56 as described above for securing rail or brace members 8 either horizontally or at any desired angle on both sides of the fence post 4.

In the alternative connector assembly 130, the body portion 38 or 62 of the collar 36 or 56 is received around the fence post 4 and is secured to the fence post 4 at a selected elevation using (a) one or two elongate externally threaded bolts or pins 132 (preferably one or two elongate bolts) which extend through the holes or slots 44 or 76 and 78 of the clamping arms 40 or 72 and 74 of the collar 36 or 56 on one or on both sides of the fence post 4 and (b) a pair of opposing nuts 134 and 136 which are positioned on each such elongate bolt 136 outside of each pair of clamping arms 40 or 72 and 74 and are tightened toward each other (i.e., against the clamping arms 40 or 72 and 74) to thereby clamp the collar 36 or 56 on the fence post 4. The length and positioning of the elongate bolt(s) 132 are such that, after the opposing nuts 134 and 136 are tightened and the collar 36 or 56 is thereby clamped in place on the fence post 4, proximal and distal end segments 138 and 140 of the elongate bolt(s) 136 extend laterally outward on opposite sides of the clamping arms 40 or 72 and 74 of the collar 36 or 56.

The coped sleeve 142 of the alternative connector assembly 130 is substantially the same as the coped sleeve 14 or 105 described above except that the opposing slots 144 on each side of the coped sleeve 142 extend all of the way through the coped forward end 146 of the sleeve 142 so that the forward ends 148 of the slots 144 are open. Consequently, to attached the rail or brace member 8 to the fence post 4 using the no-weld connector assembly 130, the coped sleeve 142 is positioned on the end of the rail or brace member 8 and the coped end 146 of the sleeve 142 is moved forwardly into engagement with the laterally projecting proximal and distal end segments 138 and 140 of the elongate bolt 132 such that the laterally projecting end segments 138 and 140 of the elongate bolt 132 are received in the open forward ends 148 of the opposing side slots 144 of the sleeve 142.

In addition, the laterally projecting proximal and distal end segments 138 and 140 of the elongate bolt 132 can be positioned in the side slots 144 of the sleeve 142 at any depth needed to accommodate (a) any variation in the distance between adjacent fence posts 4 and/or the cut length of the rail or brace member 8 and/or (b) whatever attachment angle is needed for securing the rail or brace member 8 to the fence post 4. Also, once the side slots 144 of the sleeve 142 are received on the end segments 138 and 140 of the bolt 132 at the desired position and angle, the sleeve 142 can be further secured in this position by threading a nut 150 onto the distal end segment 140 of the bolt 132 and tightening the nut 150 against the exterior of the sleeve 142.

Alternatively or in addition, the sleeve 142 can be locked into position on the rail or brace member 8 by providing one pair or a series of pairs of holes 152 through the top and bottom of the sleeve 142 which mate with one or more pairs of corresponding holes provided through the rail or brace member 8 for receiving a locking pin or bolt. Alternatively, in the case of a compression connection, the pin or bolt can simply be inserted through the pair of holes 152 in the sleeve 142 forwardly of the end of the rail or brace member 8 to stop the end of the rail or brace member 8 at a desired compression insertion point in the sleeve 142.

Figure 46:
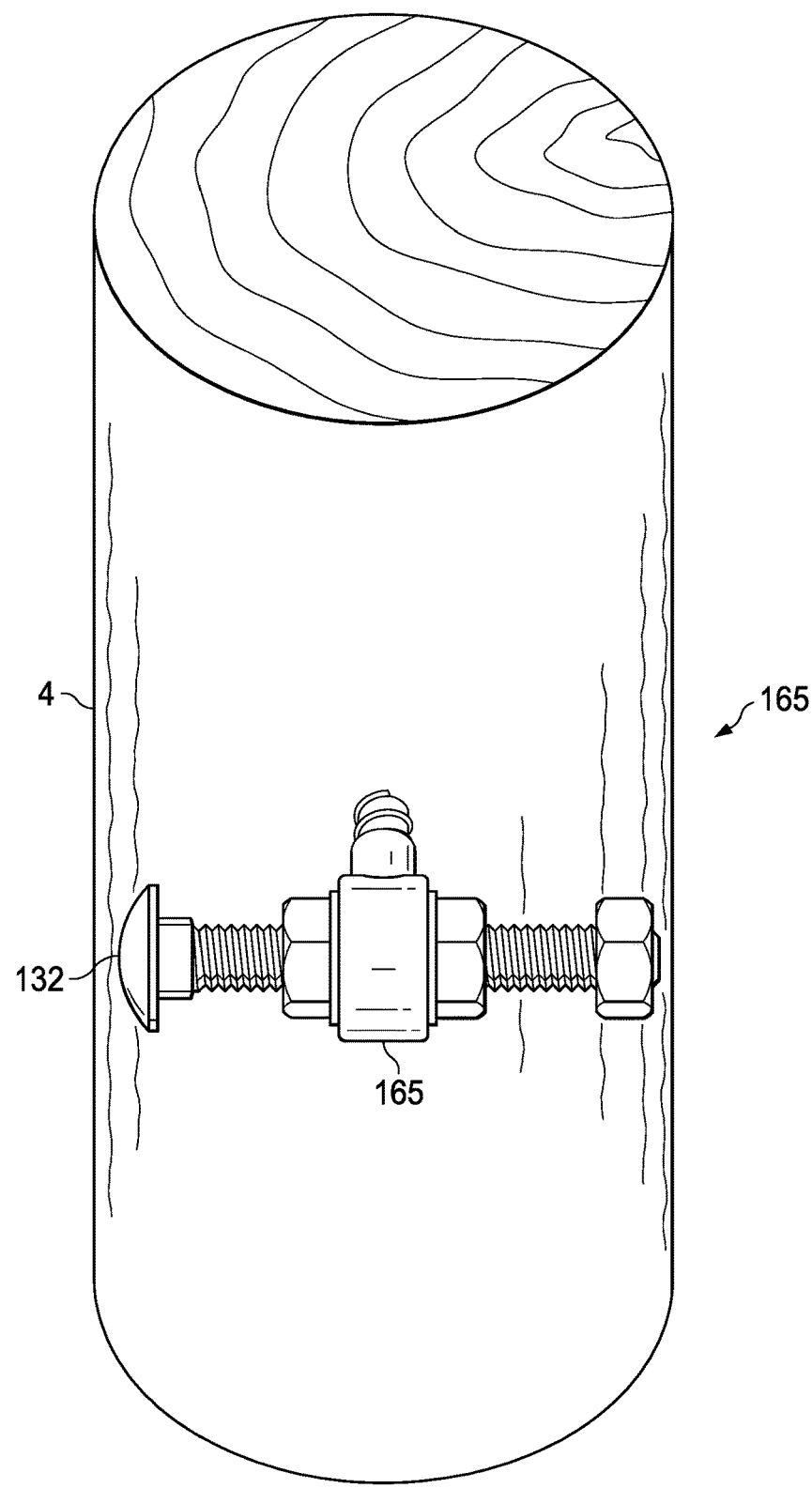
FIG. 46 illustrates an alternative embodiment 164 using an eye screw or eye bolt 165, rather than a collar, for securing an elongate threaded bolt or pin 132 in a lateral orientation on the vertical fence post 4 for the mating of a connecting sleeve therewith.

In another alternative embodiment 164 as illustrated in FIG. 46, the elongate threaded bolt or pin 132 can instead be secured in a lateral orientation on the vertical fence post 4 using an eye screw or eye bolt 165.

Figure 43:
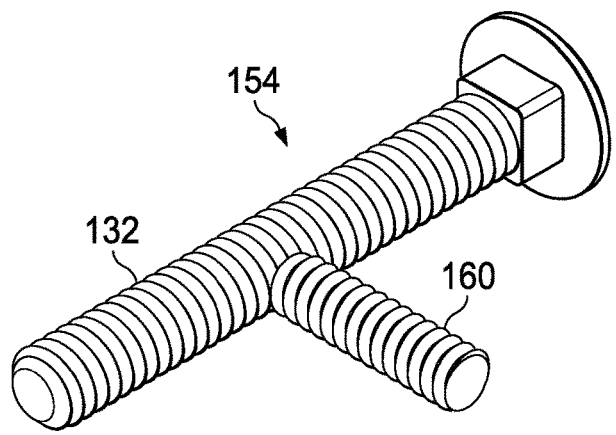
FIG. 43 is a perspective view of a T-shaped structure 154 for use in the connector assembly 130 as an alternative to using the collar 36 or the two piece collar 56.
Figure 44:
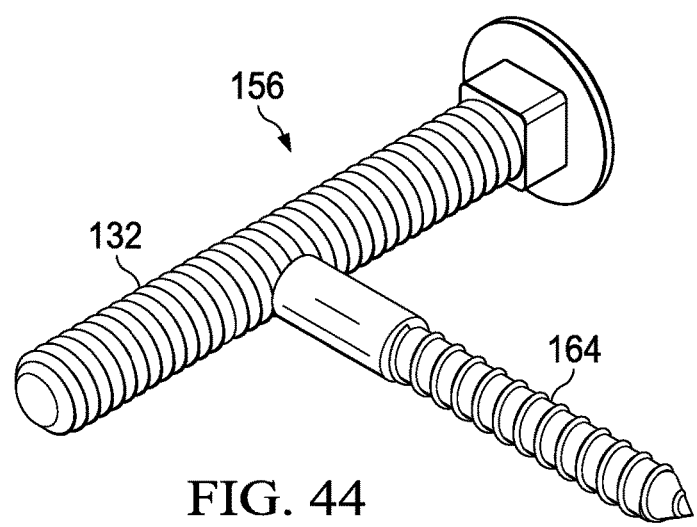
FIG. 44 is a perspective view of another T-shaped structure 156 for use in the connector assembly 130 as an alternative to using the collar 36 or the two piece collar 56.
Figure 45:
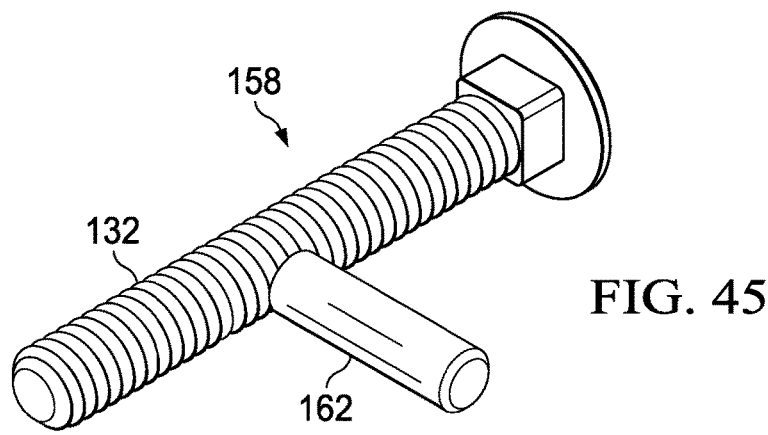
FIG. 45 is a perspective view of another T-shaped structure 158 for use in the connector assembly 130 as an alternative to using the collar 36 or the two piece collar 56.

In yet another alternative, similar to the structure and operation of the T-shaped hinge elements 27, 33, 35 described above, the collar 36 or 56 used in the inventive connector assembly 130 can be replaced with any of the T-shaped structures 154, 156, or 158 shown in FIGS. 43-45. The T-shaped structure 154 shown in FIG. 43 comprises the externally threaded bolt or pin 132 used in the connector assembly 130 having a perpendicular threaded pin 160 welded to or otherwise extending from the center of the bolt 132 so that the perpendicular threaded pin 160 can be inserted into a hole provide through the wall of the fence post 4 at a desired height and then locked in place by threading a nut onto the threaded pin 160 on the interior side of the fence post 4. The T-shaped structure 158 shown in FIG. 45 is identical except that the perpendicular pin 162 of the structure 158 is not threaded and is simple retained in the hole provided in the fence post 4 by a compressive force exerted on the structure 158 by the rail or brace member 8 and the sleeve 142. In the T-shaped structure 156 shown in FIG. 44, on the other hand, the perpendicular structure extending from the elongate bolt 132 is a screw 164 for attachment of the T-shaped structure 156 to a wooden fence post 4.

Although the sleeve 14, 105, or 142 of the inventive no-weld connector assembly 10 or 130 has been shown and described as being a coped sleeve having side attachment slots, it will be understood that the forward end of the sleeve 14, 105 or 142 can also be flat, rather than coped, or can have any other shape which is not coped. Also, the pivot attachment openings 84 and 86 of the sleeves 14 and 105 can be holes rather than slots. In addition, although the inventive connector assemblies 10 and 130 have been described as removable no-weld connectors, it will also be understood that, once installed, the user could also weld any or all of the components of the inventive connector assembly 10 or 130 in permanent position if desired.

The inventive no-weld connector assemblies 10 and 130 will preferably be constructed of steel but can alternatively be formed of any other metal or alloy, or even a suitable plastic material, which is sufficiently strong and weather resistant. It will also be understood, as mentioned above, that the fence post 4 to which the inventive no-weld connector assembly 10 or 130 is adapted and attached can be round, oval, square, rectangular or any other desired shape.

Figure 26:
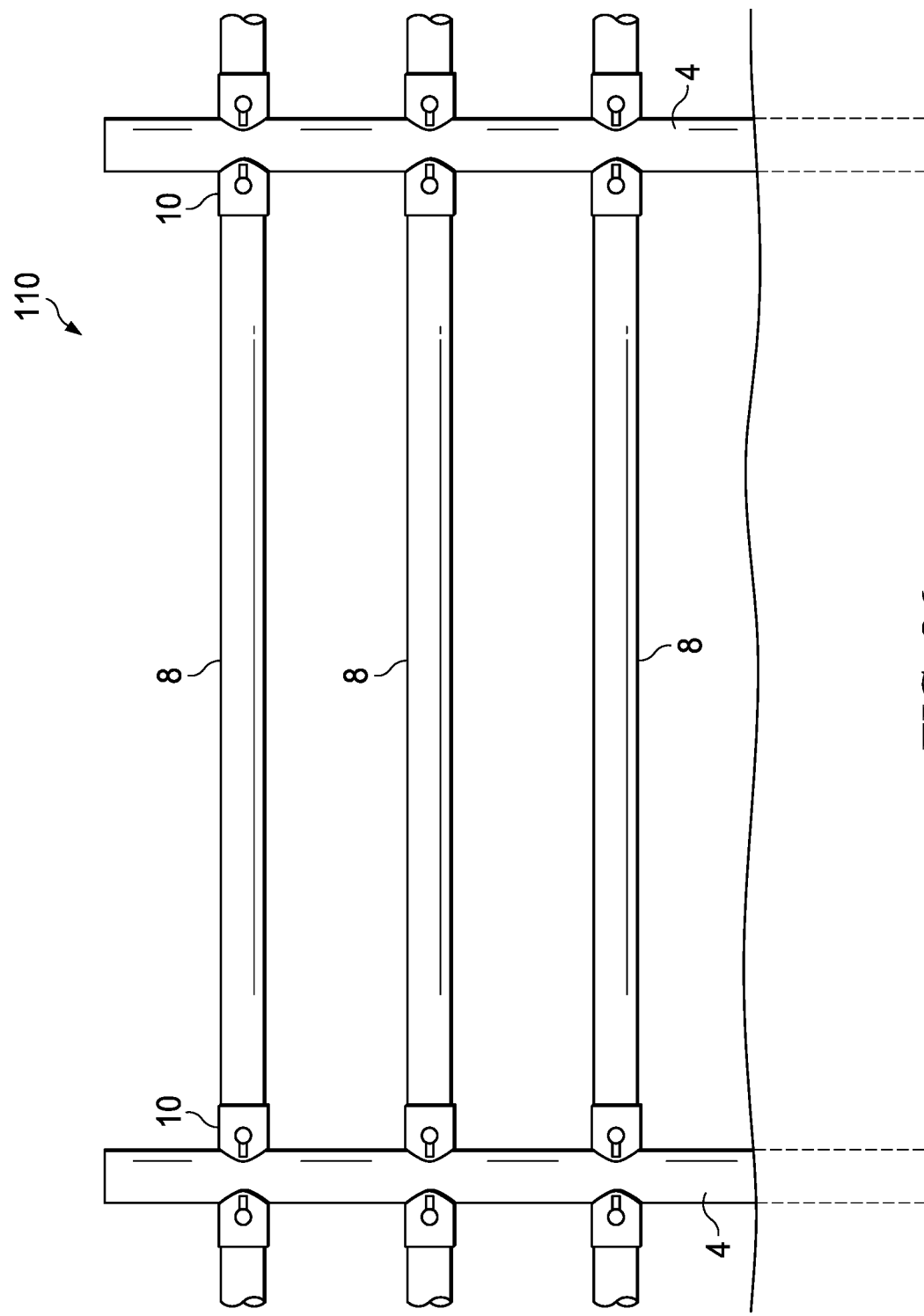
FIG. 26 illustrates a three rail pipe fence 110 provided by the present invention.
Figure 27:
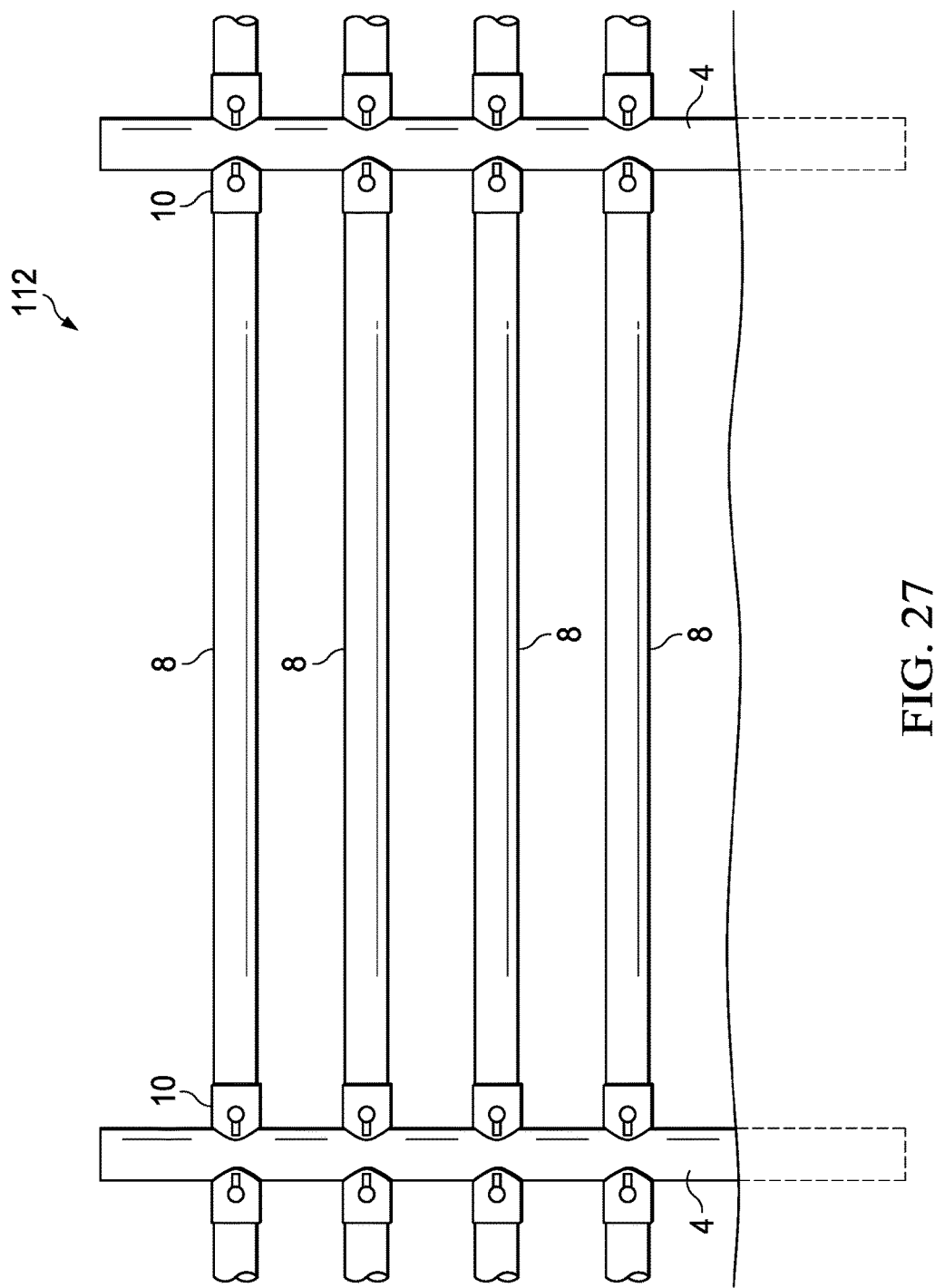
FIG. 27 illustrates a four rail pipe fence 112 provided by the present invention.
Figure 28:
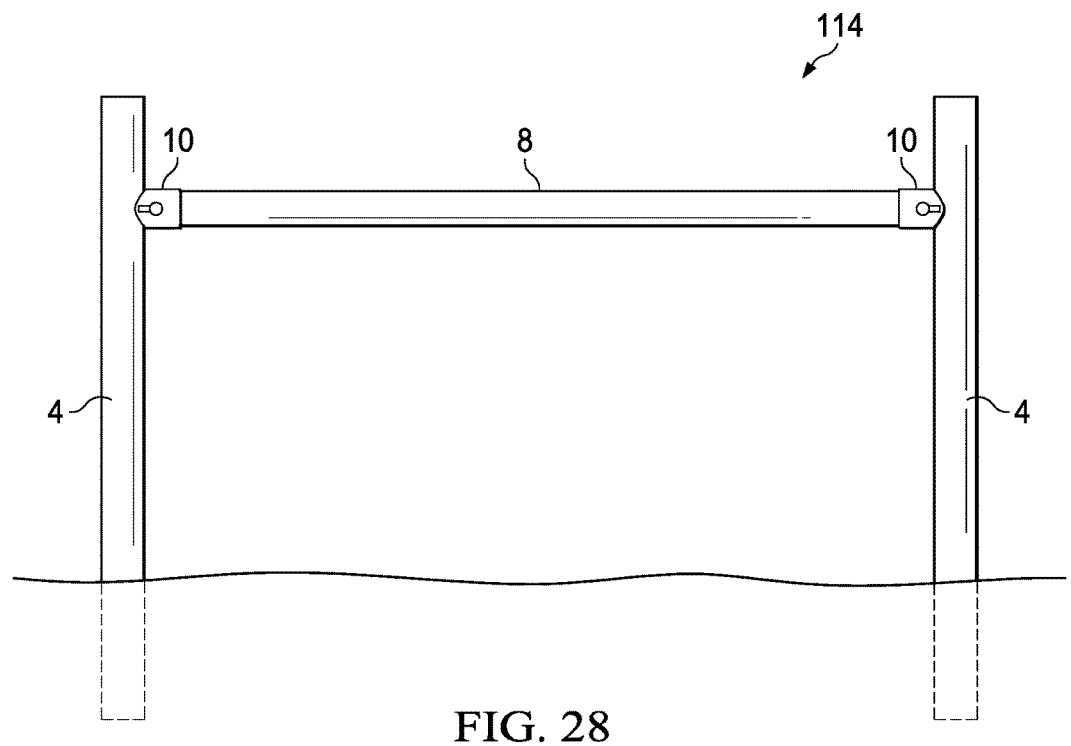
FIG. 28 illustrates a compression single H fence end brace 114 provided by the present invention.
Figure 29:
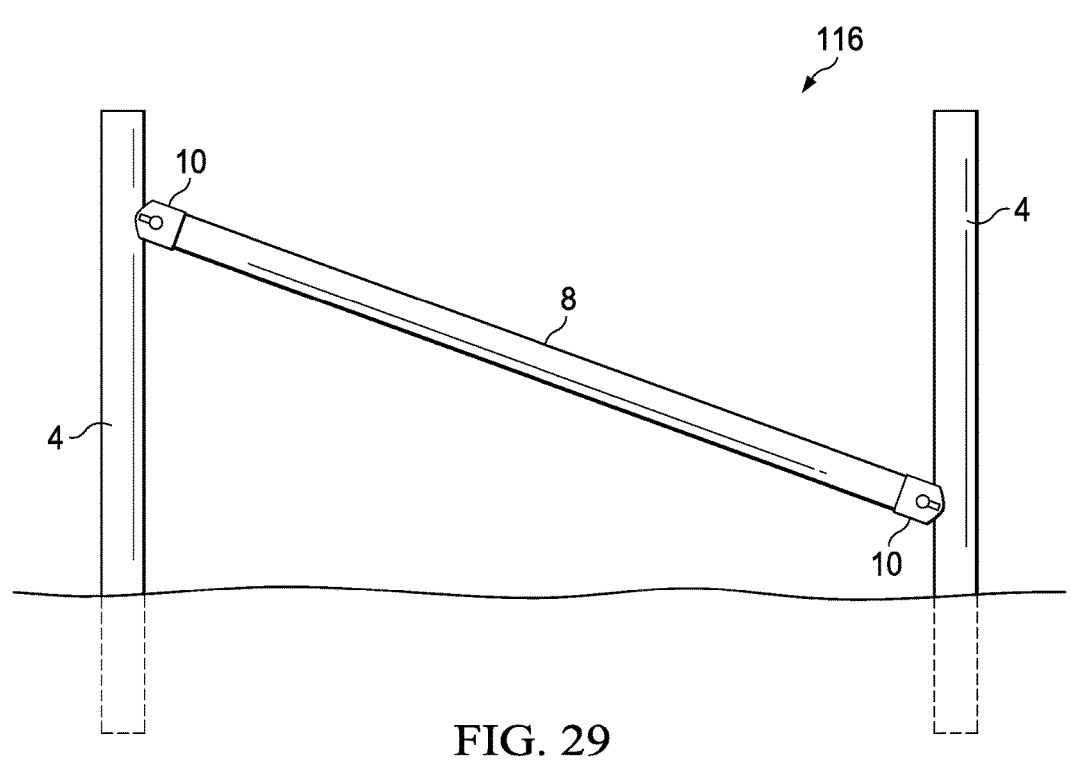
FIG. 29 illustrates a compression single diagonal fence end brace 116 provided by the present invention.
Figure 30:
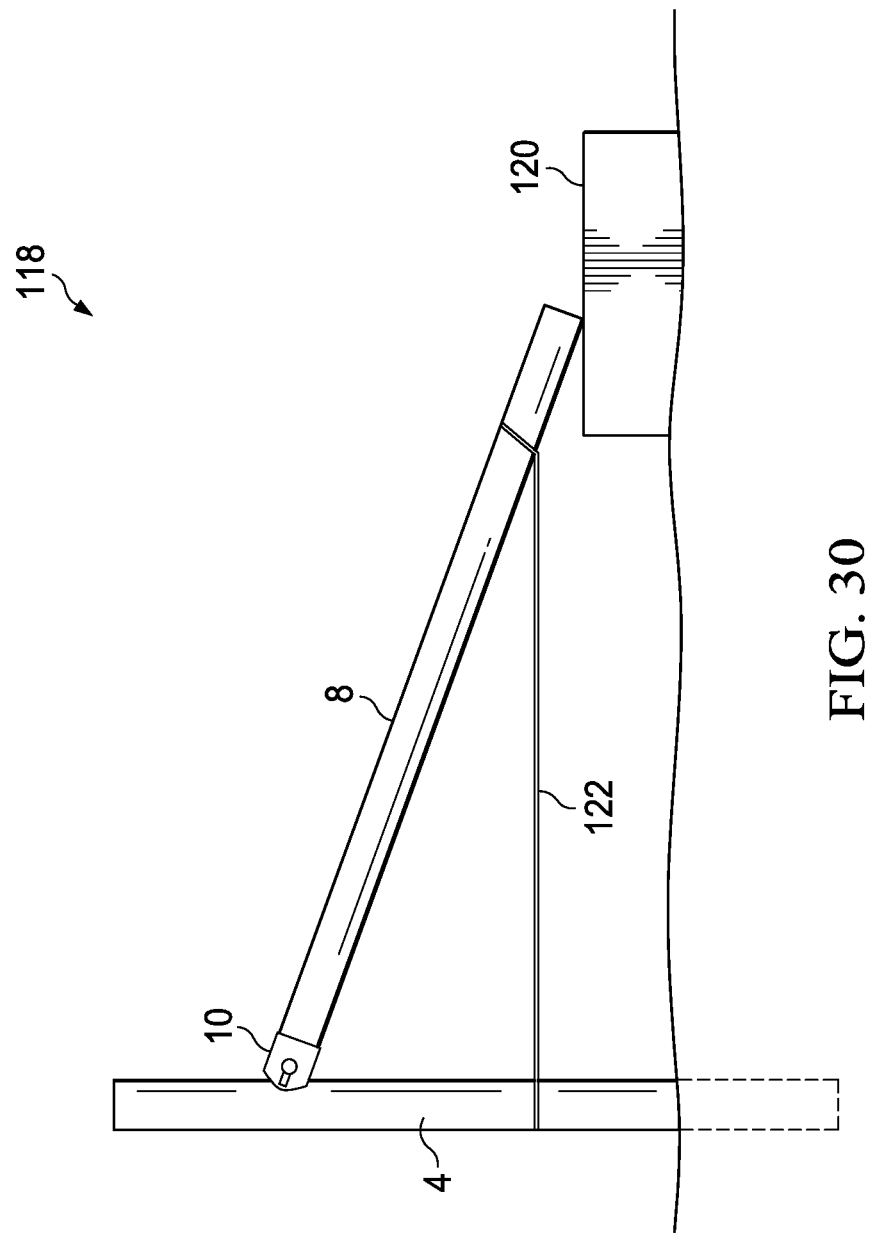
FIG. 30 illustrates a compression single floating diagonal fence end brace 118 provided by the present invention using a rock or pad 120 and a tension rod, cable, or wire 122.
Figure 31:
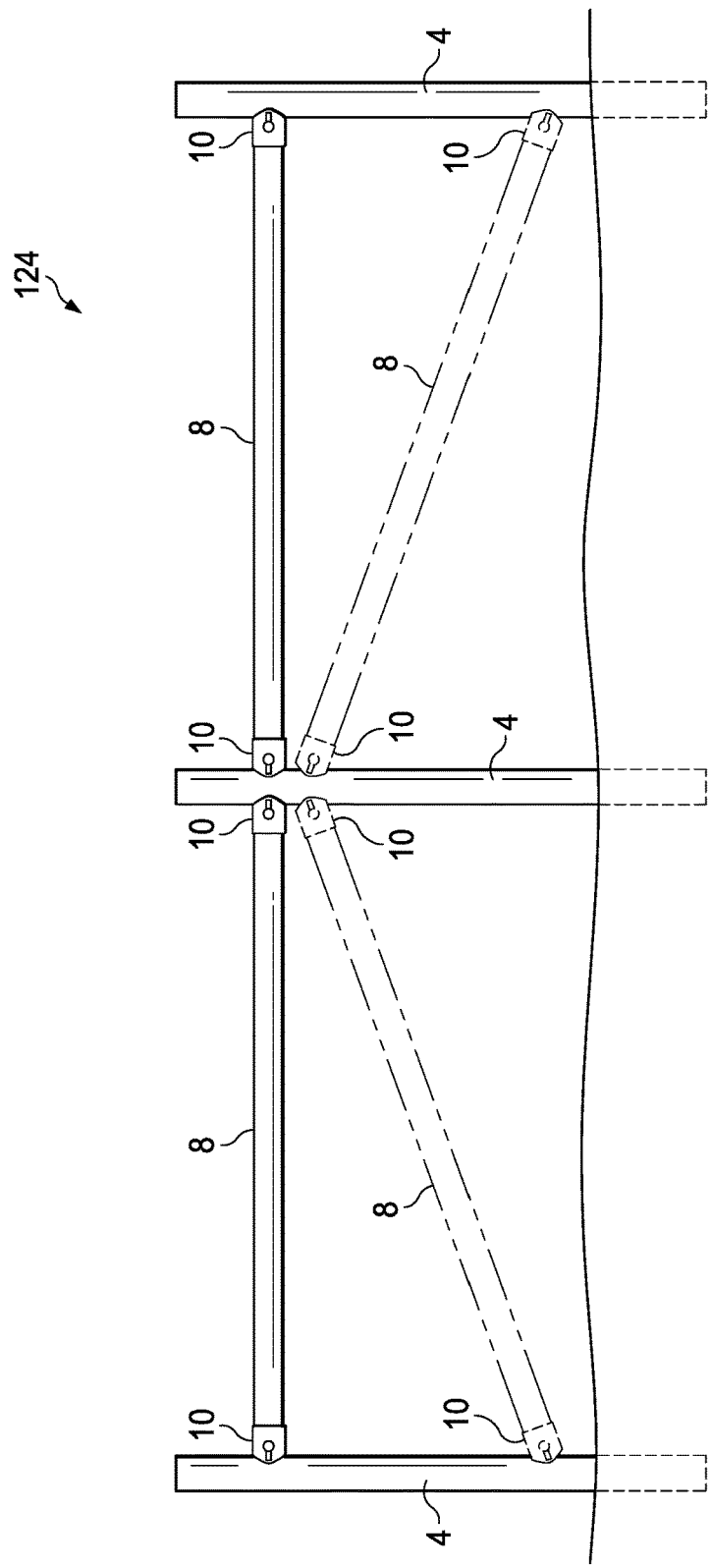
FIG. 31 illustrates a compression double diagonal or double H fence end brace 124 provided by the present invention.
Figure 32:
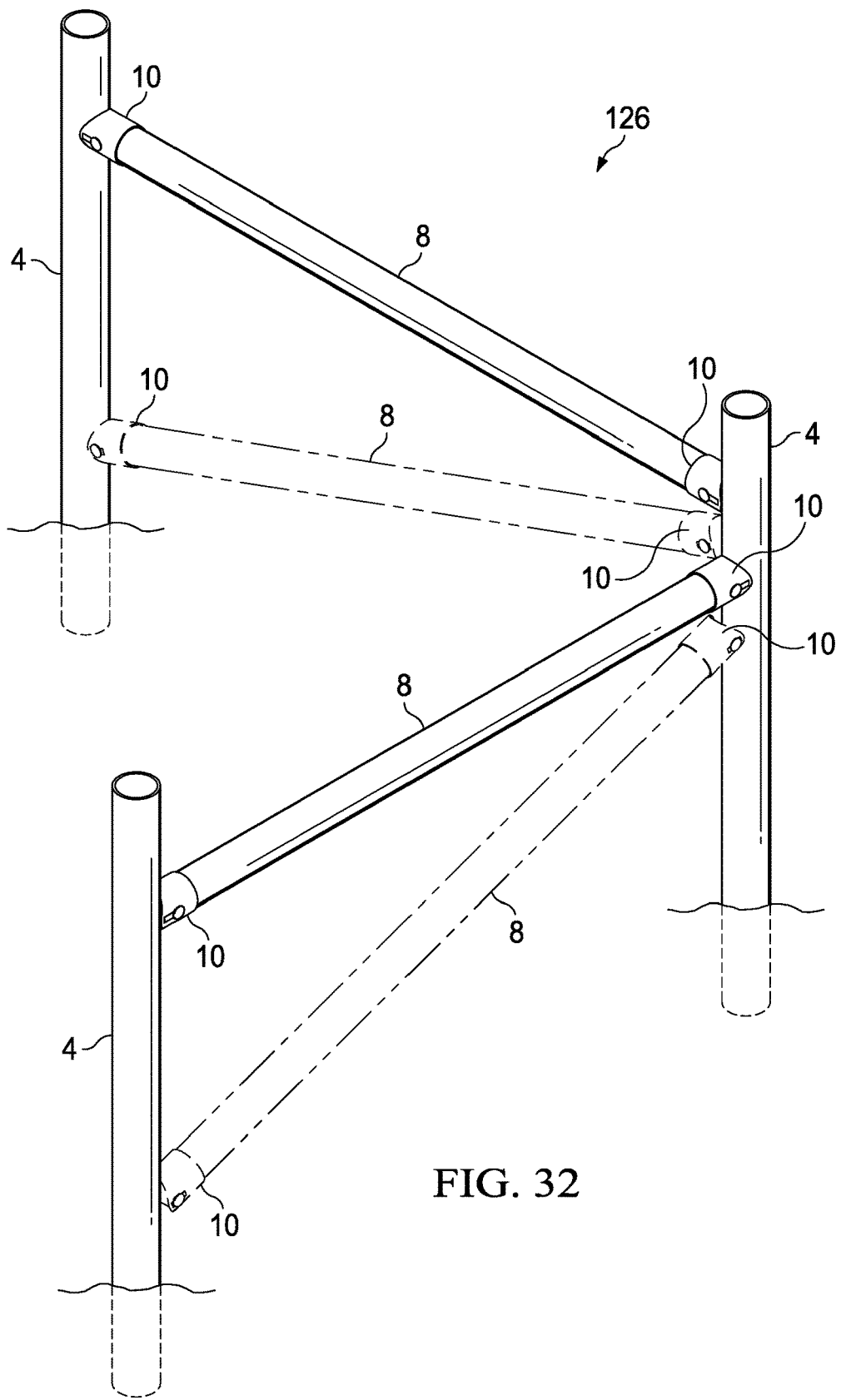
FIG. 32 illustrates a compression single H or single diagonal fence corner brace 126 provided by the present invention.
Figure 33:
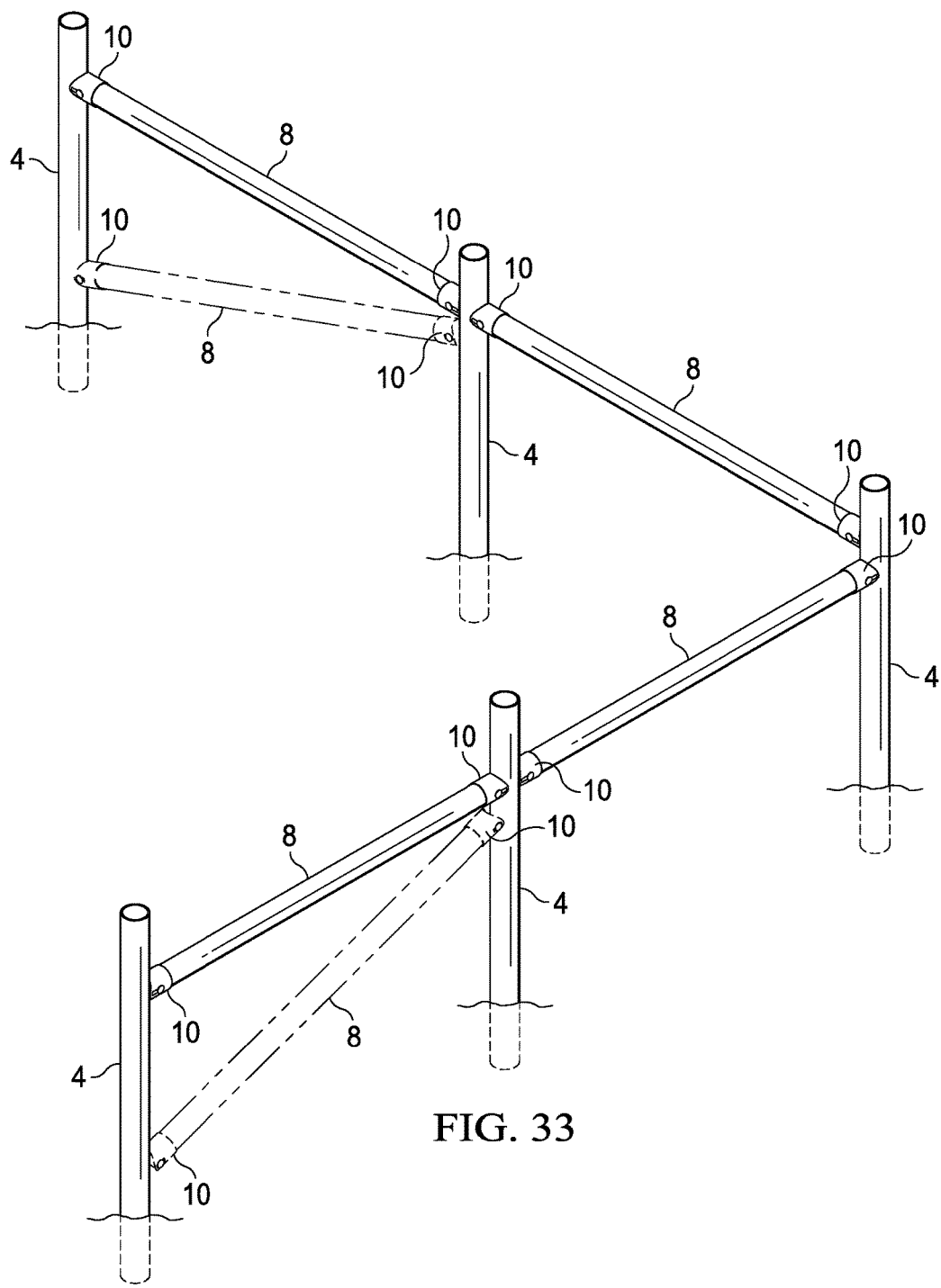
FIG. 33 illustrates a compression double H or double diagonal fence corner brace 128 provided by the present invention.

By way of example, but not by way of limitation, the use of the inventive connector assembly and method to construct various types of fences, fence corner braces, and fence end braces is illustrated in FIGS. 26-33. A three rail pipe fence 110 is illustrated in FIG. 26. A four rail pipe fence 112 is illustrated in FIG. 27. A compression single H fence end brace 114 is illustrated in FIG. 28. A compression single diagonal fence end brace 116 is illustrated in FIG. 29. A compression single floating diagonal fence end brace 118 using a rock or pad 120 and a tension rod, cable or wire 122 is illustrated in FIG. 30. A compression double diagonal or double H fence end brace 124 is illustrated in FIG. 31. A compression single H or single diagonal fence corner brace 126 is illustrated in FIG. 32. A compression double H or double diagonal fence corner brace 128 is illustrated in FIG. 33.

Thus, the present invention is well adapted to carry out the objects and attain the ends and advantages mentioned above as well as those inherent therein. While presently preferred embodiments have been described for purposes of this disclosure, numerous changes and modifications will be apparent to those in the art. Such changes and modifications are encompassed within this invention as defined by the claims.

What is claimed is:

1. A connector assembly for connecting a fence rail or brace member to a fence post, the connector assembly comprising:
   an externally threaded attachment bolt or pin which is attachable to an upwardly extending fence post such that the externally threaded attachment bolt or pin will extend laterally with respect to the upwardly extending fence post;
   an attachment sleeve which is slideably positionable on an end of a fence rail or brace member, the attachment sleeve having a first side opening on a first laterally side of the attachment sleeve and an opposing second side opening on a second lateral side of the attachment sleeve;
   the externally threaded attachment bolt or pin being receivable by the attachment sleeve such that (i) a first end portion of the externally threaded attachment bolt or pin extends through the first side opening of the attachment sleeve, (ii) a second end portion of the externally threaded attachment bolt or pin extends through the opposing second side opening of the attachment sleeve, and (iii) the attachment sleeve can be pivoted on the externally threaded attachment bolt or pin to a selected position which can be perpendicular to the upwardly extending fence post or can be up to at least ±15° from the position which is perpendicular to the upwardly extending fence post; a
   collar receivable on the upwardly extending fence post for attaching the externally threaded attachment bolt or pin to the upwardly extending fence post, the collar having at least one pair of opposing, outwardly extending attachment arms having openings provided therethrough receiving the externally threaded attachment bolt or pin;
   a pair of nuts or other internally threaded attachments which are threadedly positioned on the externally threaded attachment bolt or pin and are positioned outside of and tightened against the outwardly extending attachment arms of the collar for tightening the collar on the upwardly extending fence post; and
   the connector assembly further comprising at least one nut or other internally threaded attachment which is threadedly received on at least one of the first and the second end portions of the externally threaded, attachment bolt or pin to lock the attachment sleeve in place on the externally threaded attachment bolt or pin at the selected position.

2. The connector assembly of claim 1 wherein the attachment sleeve has a coped forward end which, as viewed from above, comprises corresponding semicircular, rearwardly extending indentations in a top wall and in a bottom wall of the coped forward end of the attachment sleeve.

3. The connector assembly of claim 1 wherein:
   the outwardly extending attachment arms of the collar are received in a forward end of the attachment sleeve, and the forward end of the attachment sleeve is a coped forward end which, as viewed from above, comprises corresponding semicircular, rearwardly extending indentations in a top wall and in a bottom wall of the forward end of the attachment sleeve.

4. The connector assembly of claim 3 wherein the coped forward end of the attachment sleeve has forwardly projecting side ears which, as viewed from a lateral side of the attachment sleeve, have flat forward ends.

5. The connector assembly of claim 3 wherein the radius of curvature of the semicircular, rearwardly extending indentations in the top and the bottom walls of the coped forward end of the attachment sleeve is greater than or equal to an outer radius of curvature of the collar.

6. The connector assembly of claim 1 wherein the first and the second side openings of the attachment sleeve are side slots having open forward ends at a forward end of the attachment sleeve, the first and the second end portions of the externally threaded attachment bolt or pin being receivable in the first and the second side slots through the open forward ends of the first and the second side slots.

7. The connector assembly of claim 1 wherein the attachment sleeve is cylindrical.

\* \* \* \* \*

UNITED STATES PATENT AND TRADEMARK OFFICE
CERTIFICATE OF CORRECTION

Page 1 of 1

PATENT NO. : 10,422,155 B2
APPLICATION NO. : 15/363944
DATED : September 24, 2019
INVENTOR(S) : Ronald D. Goedecke It is certified that error appears in the above-identified patent and that said Letters Patent is hereby corrected as shown below:

In the Claims

Claim 1, Column 12, Line 39: Delete the "a" after the ";"

Claim 1, Column 12, Line 40: Add an "a" before the word "collar"

Claim 1, Column 12, Line 56: Delete the "," after the word "threaded"

Signed and Sealed this
Nineteenth Day of November, 2019

Andrei Iancu
*Director of the United States Patent and Trademark Office*